United States Patent
Mifsud et al.

(10) Patent No.: US 12,289,200 B2
(45) Date of Patent: Apr. 29, 2025

(54) VIRTUAL VEHICLE DOMAIN CONTROL UNIT (DCU) SERVICE AND ORCHESTRATION ENVIRONMENTS

(71) Applicant: Amazon Technologies, Inc., Seattle, WA (US)

(72) Inventors: David Joseph Mifsud, Bothell, WA (US); Edwin Ricardo Mendez Rodriguez, Seattle, WA (US); Michael Garcia, New York, NY (US); Brett Francis, Redwood City, CA (US); Matthew Jonathan Narksusook, Seattle, WA (US); Abhijit Dayakar, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 17/014,742

(22) Filed: Sep. 8, 2020

(65) Prior Publication Data

US 2022/0078077 A1 Mar. 10, 2022

(51) Int. Cl.
*G06F 8/61* (2018.01)
*G06F 9/445* (2018.01)
(Continued)

(52) U.S. Cl.
CPC ............ *H04L 41/0806* (2013.01); *G06F 8/64* (2013.01); *G06F 9/44542* (2013.01);
(Continued)

(58) Field of Classification Search
None
See application file for complete search history.

(56) References Cited

U.S. PATENT DOCUMENTS 8,705,527 B1 4/2014 Addepalli et al.
9,280,653 B2 3/2016 Forest
(Continued)

FOREIGN PATENT DOCUMENTS

WO 2020047016 A1 5/2020
WO 2020210729 A1 10/2020

OTHER PUBLICATIONS

Lili Zhang et al., "A DRM System Based on PKI", 2010 Fourth International Conference on Genetic and Evolutionary Computing, IEEE, 2010, pp. 522-525.
(Continued)

*Primary Examiner* — Lewis A Bullock, Jr.
*Assistant Examiner* — Mark A Gooray
(74) *Attorney, Agent, or Firm* — Alexander A. Knapp; Kowert, Hood, Munyon, Rankin & Goetzel, P.C.

(57) ABSTRACT

A system comprising one or more computers implements a virtual domain control unit/virtual electronic control unit service configured to deploy vehicle code packages to one or more of a plurality of supported virtual domain control unit/electronic control unit orchestration environments, which include both a local orchestration environment and one or more remote orchestration environments. In such orchestration environments, virtual domain control units and/or virtual electronic control units are implemented that execute code included in the vehicle code packages. In some embodiments, such virtual domain control units or virtual electronic control units allow computing capacity and/or data storage capacity of a vehicle to be augmented via remotely implemented virtual domain control units and/or remotely implemented virtual electronic control units.

20 Claims, 19 Drawing Sheets

(51) Int. Cl.
  *G06F 9/455* (2018.01)
  *G06F 9/50* (2006.01)
  *H04L 12/40* (2006.01)
  *H04L 41/0806* (2022.01)
  *H04L 41/5054* (2022.01)
  *H04L 67/00* (2022.01)

(52) U.S. Cl.
  CPC ........ *G06F 9/45558* (2013.01); *G06F 9/5044* (2013.01); *H04L 12/40* (2013.01); *H04L 41/5054* (2013.01); *H04L 67/34* (2013.01); *G06F 2009/45595* (2013.01); *G06F 2209/506* (2013.01); *H04L 2012/40215* (2013.01)

(56) References Cited

U.S. PATENT DOCUMENTS

| | | | |
|---|---|---|---|
| 9,854,442 | B2 | 12/2017 | Mazzara, Jr. |
| 10,120,665 | B1* | 11/2018 | Sunarno ................ G06F 11/34 |
| 10,534,368 | B2 | 1/2020 | Sethu |
| 10,554,738 | B1* | 2/2020 | Ren ....................... G06F 9/4818 |
| 11,314,495 | B2 | 4/2022 | Francis |
| 2007/0109138 | A1 | 5/2007 | Farrell |
| 2008/0244595 | A1 | 10/2008 | Eilam |
| 2010/0134501 | A1 | 6/2010 | Lowe |
| 2015/0207859 | A1* | 7/2015 | Lu .......................... H04L 67/12 709/202 |
| 2016/0099806 | A1 | 4/2016 | Racklyeft et al. |
| 2016/0314224 | A1 | 10/2016 | Wei et al. |
| 2016/0330032 | A1 | 11/2016 | Naim et al. |
| 2016/0349400 | A1 | 12/2016 | Chen et al. |
| 2018/0041416 | A1 | 2/2018 | Dorum |
| 2018/0046869 | A1 | 2/2018 | Cordell et al. |
| 2018/0077376 | A1 | 3/2018 | Armeni et al. |
| 2018/0266856 | A1 | 9/2018 | Broadley et al. |
| 2018/0373266 | A1 | 12/2018 | Sethu |
| 2019/0179979 | A1 | 6/2019 | Melick |
| 2019/0240581 | A1 | 8/2019 | Walker |
| 2019/0283529 | A1 | 9/2019 | Macneille |
| 2019/0302259 | A1 | 10/2019 | Van Fleet et al. |
| 2020/0010084 | A1 | 1/2020 | Pathak |
| 2020/0062269 | A1* | 2/2020 | Vardharajan ...... B60W 50/0098 |
| 2020/0074266 | A1 | 3/2020 | Peake et al. |
| 2020/0089487 | A1 | 3/2020 | Ramic et al. |
| 2020/0184231 | A1 | 6/2020 | Viswanathan |
| 2020/0258320 | A1 | 8/2020 | Lu |
| 2020/0282999 | A1 | 9/2020 | Mizrachi |
| 2021/0004017 | A1 | 1/2021 | Colgate |
| 2021/0019457 | A1 | 1/2021 | Brown et al. |
| 2021/0286923 | A1 | 9/2021 | Kristensen |
| 2022/0080913 | A1 | 3/2022 | Abaza |
| 2022/0147337 | A1* | 5/2022 | Michelsohn ........ G06F 11/1433 |
| 2022/0161744 | A1 | 5/2022 | Vangoethem |
| 2022/0261601 | A1 | 8/2022 | Amato |
| 2023/0027455 | A1 | 1/2023 | Bulut |

OTHER PUBLICATIONS

Mattias Ohrn, "Publice Key Infrastructure Utilisation in Digital Rights Management", KTH Numerical Analysis and Computer Science, 2004, pp. 1-84.
U.S. Appl. No. 16/581,571, filed Sep. 24, 2019, Michael Christopher Wenneman.
U.S. Appl. No. 16/453,921, filed Jun. 26, 2019, Marco Argenti.
U.S. Appl. No. 16/385,070, filed Mar. 30, 2020, Brett Francis.
U.S. Appl. No. 17/219,711, filed Mar. 31, 2021, Edwin Ricardo Mendez Rodriguez, et al.
U.S. Appl. No. 17/037,376, filed Sep. 29, 2020, Michael Garcia, et al.
Sayfan, Gigi, "Matering Kubernetes," May 17, 2017, Packt Publishing Ltd., Birmingham UK.
Youn J. et al: "Heuristic resource allocation and scheduling method for distributed automotive control systems", International Journal of Automotive Technology, [Online] Jul. 28, 2013 vol. 14, No. 4, pp. 611-624, Heidelberg.
Invitation to Pay Additional Fees And, Where Applicable, Protest Fee mailed Dec. 1, 2021 in International Application No. PCT/US2021/047839, Amazon Technologies, Inc., pp. 1-17.
International Search Report and Written Opinion Mailed Jan. 25, 2022 in International Application No. PCT/US2021/047839, Amazon Technologies, Inc., pp. 1-21.
Sami, Hani, et al "Vehicular-OBUs-As-On-Demand-Fogs: Resource and Context Aware Deployment of Containerized Micro-Services", IEEE /ACM Transactions On Networking, Mar. 11, 2020, pp. 778-790, vol. 28, No. 2, New York, NY, US.
Esen, Hasan, et al., "Control as a Service (CaaS): Cloud-based Software Architecture for Automotive Control Applications," Proceedings of the Second International Workshop On the Swarm At the Edge of the Cloud [Online], Apr. 13, 2015, pp. 13-18, New York, NY, USA, ISBN: 978-1-4503-3595-9; [retrieved on Nov. 18, 2021].

* cited by examiner

Implement, on one or more computing devices of a vehicle, a virtual domain control unit (EDU)/ virtual electronic control unit (ECU) orchestration environment configured to receive vehicle code packages/ virtual DCUs/ECUs via a network connection to the vehicle and configured to implement virtual DCUs/ ECUs during production of a vehicle or subsequent to the vehicle being put into use by an owner or operator of the vehicle
1102

Establish communication channels between existing components of the vehicle and the virtual DCU/ECU orchestration environment via an in-vehicle bus of the vehicle
1104

Receive, at the vehicle via a connection to a virtual DCU service, one or more vehicle code packages/ virtual DCUs/virtual ECUs, wherein the vehicle code packages/virtual DCUs/virtual ECUs comprise code logic and mappings in an enveloped format and one or more annotations for the vehicle code package/ virtual DCU/virtual ECU outside of the envelope
1106

Determine, based on the one or more annotations for a given vehicle code package/virtual DCU/virtual ECU, a particular placement location for the vehicle code package/virtual DCU/virtual ECU, wherein the placement location is selected from a group of possible placement locations including a local placement in the virtual DCU/ECU orchestration environment implemented at the vehicle and one or more remote virtual DCU/ECU orchestration environments
1108

Determine a communication mapping for each of the vehicle code packages/virtual DCUs/virtual ECUs within a respective operating system or operating system domain in which the vehicle code package/virtual DCU/virtual ECU is placed, based on the mapping included in the vehicle code package/virtual DCU/ virtual ECU
1110

Perform one or more configuration operations in accordance with the determined communication mappings to enable respective ones of the given vehicle code packages/virtual DCUs/virtual ECUs to have access to input data from one or more existing physical vehicle components available in the particular operating system or operating system domain or to have access to input data from another vehicle code package/virtual DCU/virtual ECU, also perform one or more configuration operations to enable output data from the respective ones of the given vehicle code packages/virtual DCUs/virtual ECUs to flow to output destinations in the vehicle
1112

(Optionally) Publish or advertise the new one or more virtual ECUs to other ECUs, virtual ECUs, virtual DCUs components of the vehicle, etc. and/or to other applications configured to interact with the virtual DCU/ECU orchestration environment
1114

*FIG. 11*

VIRTUAL VEHICLE DOMAIN CONTROL UNIT (DCU) SERVICE AND ORCHESTRATION ENVIRONMENTS

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicle. Such computer programs are typically implemented using physical domain control units and/or physical electronic control units that include both hardware and program instructions configured to execute control algorithms for the vehicle, or systems implemented in the vehicle. Some vehicles may include as many as 80 to 200 different domain control units and/or electronic control units. In order to guarantee a high level of safety, such sensors and domain control units/electronic control units are rigorously tested and certified to meet different performance levels, such as automotive safety integrity levels (ASIL levels). For example, depending on the criticality of a sensor or an algorithm, a higher or lower certification level may be required.

Also, because the control algorithms and rules for sharing data are typically implemented in physical domain control units/electronic control units that must be manufactured and tested before being put into operation, development time horizons for new control algorithms and rules for sharing data typically span months or years. For example, time is required to develop a new domain control unit/electronic control unit, build a physical domain control unit/electronic control unit to test, perform testing of the physical domain control unit/electronic control unit, design and build updated domain control units/electronic control units based on the results of the testing, finalize a design for a domain control unit/electronic control unit, and build physical domain control units/electronic control units according to the finalized design.

BRIEF DESCRIPTION OF THE DRAWINGS

FIG. 11 illustrates a flowchart for example operations performed by a virtual DCU/ECU orchestration environment of a vehicle, according to some embodiments.

Figure 1:
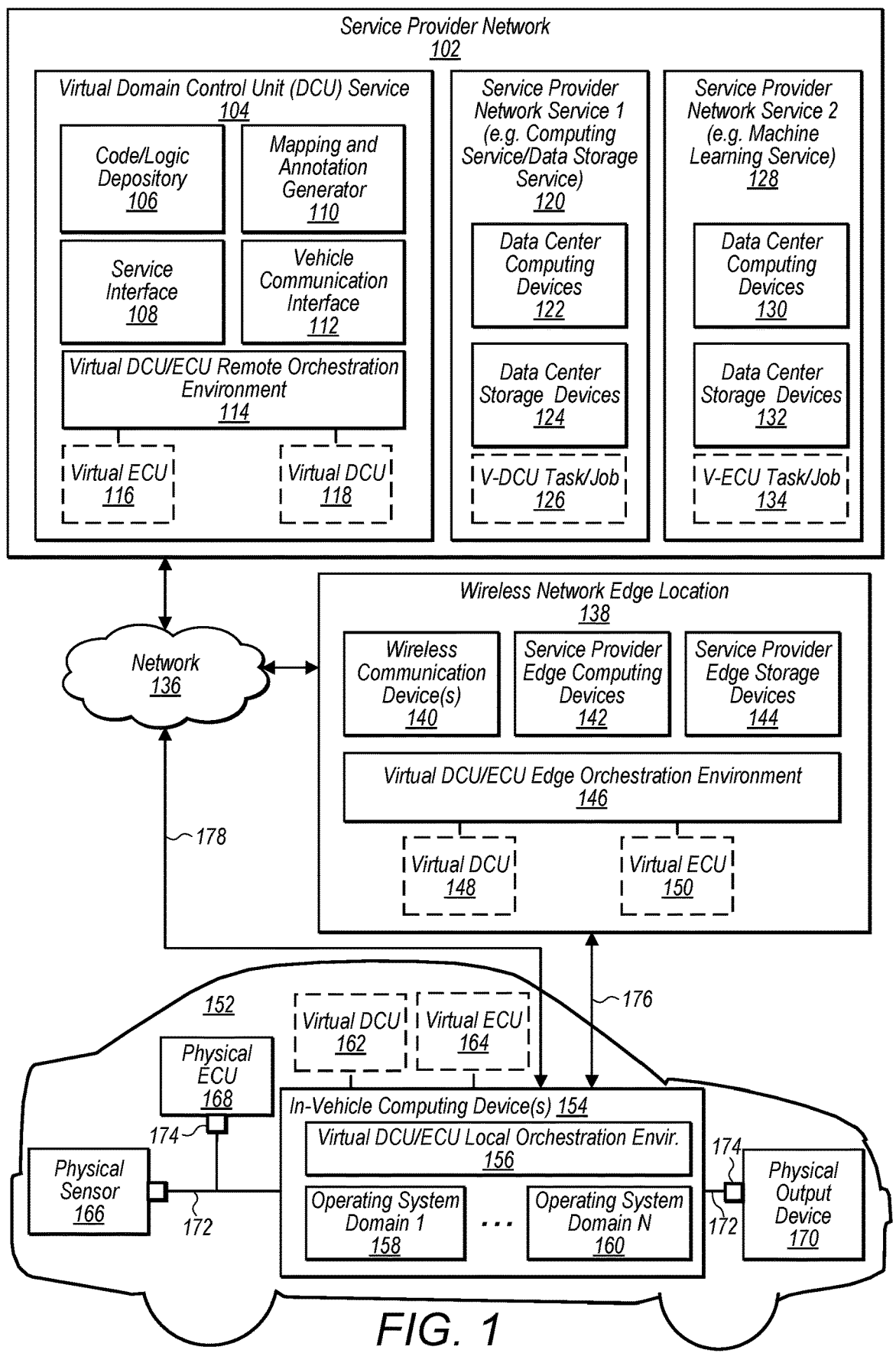
FIG. 1 illustrates virtual domain control units (virtual DCUs) and virtual electronic control units (virtual ECUs) that execute code associated with a vehicle in a local virtual DCU/ECU orchestration environment at the vehicle and also execute code associated with the vehicle in remote virtual DCU/ECU orchestration environments remote from the vehicle, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing remote virtual domain control units (virtual ECUs) and/or remote virtual electronic control units (virtual DCUs) at remote locations connected to a vehicle via a network connection and implementing a local in-vehicle virtual DCU/ECU orchestration environment that enables clients of the virtual DCU/ECU service to deploy vehicle code packages/virtual DCU packages/virtual ECU packages in vehicles that have already been made available for use by operators of the vehicles and also enables the vehicle to locally execute the vehicle code packages/virtual DCU packages/virtual ECU packages using a local virtual DCU/ECU orchestration environment of the vehicle or offload some or all of the vehicle code packages/virtual DCU packages/virtual ECU packages to remote virtual DCU/ECUs for execution based on required latencies of the vehicle code packages/virtual DCU packages/virtual ECU packages.

For example a vehicle manufacturer, a vehicle parts manufacturer, or another third party may develop new applications that use new vehicle code packages and may deploy such new types of applications and/or vehicle code packages into vehicles that have already been sold to consumers. The deployment of the new vehicle code packages may be achieved remotely over a network connection between the virtual DCU/ECU service and the vehicle, wherein an in-vehicle computing device of the vehicle implements a local virtual DCU/ECU orchestration environment that determines placement for the new vehicle code package and that further performs configuration operations to enable required input data to flow to the a virtual DCU/ECU executing the new code package from existing components of the vehicle, such as existing physical sensors, synthetic sensors, physical DCUs, physical ECUs, other virtual DCUs, other virtual ECUs, etc. The local and/or remote virtual DCU/ECU orchestration environments also perform configuration operations to enable output data from the new vehicle code package to flow to output destinations for the new vehicle code package, such as actuators of the vehicle, other control systems of the vehicle, physical sensors of the vehicle, synthetic sensors of the vehicle, physical DCUs, physical ECUs in the vehicle, other virtual DCUs implemented locally on the vehicle or remotely, other virtual ECUs implemented locally on the vehicle or remotely, cloud-based services implemented remotely from the vehicle, such as a data storage service, a machine learning service, a database service, etc., or other suitable destinations configured to receive the output data from the new vehicle code package.

In some embodiments, virtual DCUs/ECUs that execute such vehicle code packages or other code may be implemented in a remote virtual DCU/ECU orchestration environment at a wireless network edge, such as at a location of a wireless network antennae that is in communication with the vehicle. For example, computing and data storage devices of a service provider network may be locally installed at a facility location that includes wireless communication devices, such as cellar signal antennas, etc. By locating the computing and data storage devices physically proximate to the wireless network communication devices, a communication latency between a vehicle that sends/receives wireless communications to the wireless communication devices and the computing and data storage devices receiving the communications from the vehicle may be minimized as compared to other configurations. For example, a latency between components in the vehicle, such as sensors and the remote computing devices and data storage devices located at the wireless network edge may be less than a latency between the vehicle components and other network locations that are connected to the wireless network via other intermediate networking devices. For example, resources located at a wireless network edge may have lower latencies than resources located in data centers connected to the wireless network via an intermediate network, such as the public Internet, or a private network of a service provider.

In some embodiments, in addition to, or instead of, implementing a remote virtual DCU/ECU orchestration environment at a wireless network edge, a service provider may implement a remote virtual DCU/ECU orchestration environment using regional resources of a region of a service provider network within which the vehicle is located. For example, a service provider network may include one or more data centers in a region that house computing, networking, and data storage equipment. While the regional resources may be located at a distance from wireless communication devices that establish a wireless connection with a vehicle, such as a cellular antennae, the regional resources may include a larger quantity and variety of computing and data storage devices configured to offer a greater selection of services. For example, for some uses of virtual DCUs/ECUs, access to greater capacity and lower cost computing and data storage resources may be a more significant factor in selecting placement for a vehicle code package/virtual DCU package/virtual ECU package than network latency between the vehicle components and the virtual DCU/ECU. Also, in some embodiments, a virtual DCU/ECU may coordinate with other services offered by a service provider network to perform tasks related to a vehicle. For example, a virtual DCU/ECU may receive vehicle data from a vehicle and provide a portion of the vehicle data to a machine learning service of a service provider network to learn patterns or relationships embedded in the vehicle data. The machine learning service may then provide results of machine learning operations back to the virtual DCU/ECU for use in further processing. Also, in some embodiments, virtual DCU/ECU output data may be provided to other recipients, other than the vehicle. For example, in some embodiments, vehicle sensor data may be provided to a remote virtual DCU/ECU that processes the sensor data to detect anomalies associated with the vehicle, such as that the vehicle has been in a collision. In such an example, the virtual DCU/ECU may provide output data to a communication system, such as phone, e-mail, text, etc. to alert emergency officials of the collision, without necessarily providing the output data back the vehicle. Though in such an example, in some embodiments, the virtual DCU/ECU may also provide output data back to the vehicle, for example by providing a message to an occupant of the vehicle that emergency officials have been alerted or are on the way.

In some embodiments, a vehicle may include multiple control domains, such as a chassis/safety domain, infotainment domain, cabin domain, drivetrain domain, etc. In some embodiments a virtual domain control unit may implement control for a particular vehicle domain. For example the infotainment domain may be implemented remotely using a remote virtual DCU. Also, in some embodiments some vehicle domains may include multiple electronic control units that implement the respective vehicle domains. For example, in the chassis domain a physical ECU may implement control for an air bag deployment system and a separate physical ECU may implement control for an anti-lock braking system. In some embodiments, a given domain may include a physical or virtual domain control unit that generally implements control for the domain and may additionally include one or more additional physical or virtual electronic control units that implement one or more control features within a given domain. Thus, a virtual domain control unit (V-DCU) may provide a virtualized computing environment in which a code package that implements a domain level control process is executed. Also, a virtual electronic control unit (V-ECU) may provide a virtualized computing environment for executing code that previously would have been implemented via a physical ECU. Also, a virtual DCU/ECU orchestration environment may implement V-DCU instances and/or V-ECU instances that execute such code packages. The virtual DCU/ECU orchestration environment may function as a hypervisor that routes communications between V-DCU instances, V-ECU instances, other provider network services/instances and physical components of the vehicle such as actuators, sensors, etc.

In some embodiments, in addition to, or instead of, using the virtual DCU/ECU service to deploy virtual DCUs/ECUs to vehicles that have already been made available for use by operators of the vehicles, a client, such as a vehicle manufacturer, may use the virtual DCU/ECU service to deploy vehicle code packages/virtual DCUs/virtual ECUs to a vehicle during the manufacturing process for the vehicle. For example, during a portion of the manufacturing process for the vehicle, after an on-board computing system has been installed and connected to a communication bus of the vehicle, vehicle code packages/virtual DCU packages/virtual ECU packages may be deployed to a virtual DCU/ECU orchestration environment in order to perform quality assurance tests for electronic systems of the vehicle and/or provide output data from the vehicle for use in manufacturing and testing the vehicle.

In some embodiments, a system includes one or more computing devices configured to be installed (or that are already installed) in a vehicle. The one or more computing devices store program instructions for implementing a local virtual domain control unit (DCU)/virtual electronic control unit (ECU) orchestration environment in the vehicle. The local DCU/ECU orchestration environment is configured to receive vehicle code packages/virtual DCU packages/virtual DCU packages from a virtual DCU/ECU service, for example that distributes new vehicle code packages/virtual DCU packages/virtual ECU packages to vehicles on behalf of a vehicle manufacturer or original equipment provider of the vehicle.

The local virtual DCU/ECU orchestration environment of the vehicle is configured to receive a package for a virtual DCU/ECU in an enveloped format comprising code for the virtual DCU/ECU and one or more annotations outside of an envelope of the virtual DCU/ECU package that indicate one or more properties or requirements of a virtual DCU/ECU that is to execute the code included in the code package. The local virtual DCU/ECU orchestration environment of the vehicle is also configured to determine a placement location for the code package, wherein the placement location is selected from a plurality of placement locations supported by the virtual DCU/ECU orchestration environment, including a local placement location within the vehicle and one or more remote placement locations on one or more computing devices that are remote from the vehicle and connected to the vehicle via one or more network connections, such as at remote virtual DCU/ECU orchestration environments. Also, the local virtual DCU/ECU orchestration environment is configured to perform one or more configuration operations to implement the package at a selected virtual DCU/ECU at the determined placement location, wherein the one or more configuration operations enable the selected virtual DCU/ECU to communicate with one or more physical DCUs of the vehicle, one or more physical ECUs of the vehicle, one or more other virtual DCUs or ECUs implemented for the vehicle, one or more sensors of the vehicle, or one or more output devices of the vehicle, etc.

In some embodiments, a system includes one or more computing devices storing program instructions for implementing a remote execution environment for vehicle code packages, such as at an edge network location or a region network location remote from a vehicle. The program instructions when executed on the one or more computing devices, cause the one or more computing devices to instantiate a code execution thread for a vehicle code package for a vehicle, in response to a placement decision to place the vehicle code package for the vehicle at the remote execution environment. The program instructions also cause the one or more computing devices at the remote location to execute code included in the vehicle code package via the one or more computing devices that implement the remote execution environment and provide data resulting from the execution of the code of the vehicle code package to one or more computing devices installed in the vehicle that implement a local orchestration environment for the vehicle.

In some embodiments, one or more non-transitory computer-readable media store program instructions for implementing an in-vehicle virtual DCU/ECU orchestration environment. The program instructions, when executed on or across one or more computing devices located at the vehicle, cause the one or more computing devices to receive a vehicle code package in an enveloped format comprising one or more annotations outside of an envelope of the vehicle code package that indicate one or more properties or requirements of the vehicle code package. The program instructions, when executed, also cause the one or more computing devices at the vehicle to determine a placement location for the vehicle code package, wherein the placement location is selected from a plurality of placement locations, including a local placement location within the vehicle and one or more remote placement locations on one or more computing devices that are remote from the vehicle and connected to the vehicle via one or more network connections. Additionally, the program instructions, when executed, also cause the one or more computing devices at the vehicle to perform one or more configuration operations to implement the vehicle code package at the determined placement location, wherein the one or more configuration operations enable a thread executing code included in the vehicle code package to communicate with one or more physical components of the vehicle or one or more other vehicle code packages implemented for the vehicle.

Vehicles are often manufactured with electronic sensors and physical computing devices, such as physical domain control units (DCUs) and physical electronic control units (ECUs) that execute control algorithms that take sensor data from the electronic sensors as inputs to the control algorithms. However, electronic sensors and associated control algorithms are often implemented as separate systems that serve a particular purpose for the vehicle, such as separate DCUs or ECUs, but that are not configured to share sensor data with other systems of the vehicle. For example, an entertainment system of a vehicle may be implemented with electronic sensors and a DCU or ECUs, such as for volume controls, but may not be configured to share sensor data with other systems of the vehicle. In some instances, this is done because separate systems of a vehicle have different certification requirements, such that the separate systems are kept separate and certified separately based on separate hardware requirements and separate control algorithm requirements.

In some embodiments, an original equipment manufacturer (OEM) manufacturer, an OEM parts manufacturer, and/or a third-party developer may develop new applications for a vehicle. In such embodiments, a client may purchase a new application from an application store of the OEM manufacturer, the OEM parts manufacturer, or the third-party developer, and the application store may provide an instruction/suggestion to an OEM of the vehicle to instruct a virtual DCU/ECU service to deploy one or more vehicle code packages to the vehicle of the client in order to implement the purchased new application. In some embodiments, a virtual DCU/ECU service and respective local virtual DCU/ECU orchestration environments in different vehicles may provide a consistent perspective for providing updated code to vehicles after the vehicles have been manufactured and/or put into service by a consumer.

For example, an OEM manufacturer, an OEM parts manufacturer, or another third-party may use a console of a virtual DCU/ECU service to develop new vehicle code packages. The developer of the new vehicle code package (e.g. OEM manufacturer, OEM parts manufacturer, or third-party) may select sensor data, DCU/ECU data, other virtual DCU/ECU data, etc. to use as inputs for the vehicle code package from a list of data types available from existing vehicle components or virtual DCUs/ECUs. The developer may also select logic elements such as algorithms (e.g. rules) or models (e.g. machine learning models) to receive selected inputs. The developer may further determine mappings between the inputs, the logic elements (e.g. the rules and/or the models), to an output of the new vehicle code package. In some embodiments, the mappings may be represented as JSON objects or XML code, wherein a virtual DCU/ECU orchestration environment in a vehicle or located remotely from the vehicle parses the JSON objects or XML code to determine relationships between inputs, logic elements (e.g. rules and/or models), and outputs. The virtual DCU/ECU orchestration environment may then cause one or more configuration operations to take place to implement the logic elements (e.g. rules and/or models) mapped to in the code logic of the vehicle code package. The virtual DCU/ECU orchestration environment may further cause one or more additional configuration operations to be taken to allow data to flow to a virtual DCU/ECU orchestration environment implementing the vehicle code package (which may be local or remote to the vehicle) according to the mapping included in the code logic of the vehicle code package.

In some embodiments, the logic elements and mapping of a vehicle code package/virtual DCU package/virtual ECU package may be included in an enveloped environment and one or more annotations may be stored as metadata of the vehicle code package/virtual DCU package/virtual ECU package (outside of the envelope) and may indicate characteristics or requirements of a virtual DCU or virtual ECU that is to implement the vehicle code package such as required inputs, optional inputs, latency requirements, compute requirements, data storage requirements, data access requirements, other service access requirements, outputs, certification levels, virtual DCU/ECU dependencies, failure modes, etc.

In some embodiments, an OEM manufacturer, an OEM parts manufacturer, or another third party may use a service interface that includes the console, or that is separate from the virtual DCU/ECU design console, to instruct the virtual DCU/ECU service to deploy one or more vehicle code packages/virtual DCU packages/virtual ECU packages to a particular vehicle or class of vehicles that qualify to receive the vehicle code package or virtual DCU package/virtual ECU package. Also, an OEM manufacturer, an OEM parts manufacturer, or another third party may use a service interface that includes the console, or that is separate from the virtual DCU/ECU design console, to instruct the virtual DCU/ECU service to deploy one or more vehicle code packages/virtual DCU packages/virtual ECU packages to virtual DCUs or virtual ECUs that are implemented on behalf of the OEM manufacturer, the OEM parts manufacturer, or the third party at remote locations, such as at a wireless network edge location or in a region of a service provider network to implement the vehicle code package/virtual ECU package. For example, an OEM manufacturer, an OEM parts manufacturer, or another third party may require a consumer to purchase an upgraded package in order to have access to new types of features that are enabled using new vehicle code packages/virtual DCU packages/virtual ECUs.

Also in some embodiments, an OEM manufacturer, an OEM parts manufacturer, or another third party may maintain multiple classes of virtual DCUs or virtual ECUs configured to execute vehicle code packages/virtual DCU packages/virtual ECU packages to implement features offered by the OEM manufacturer, OEM parts manufacturer, or third party to consumers of vehicles. In such embodiments, a consumer may request that the OEM manufacturer, OEM parts manufacturer, or third party upgrade a service offered to the consumer, wherein upgrading the service causes a vehicle code package/virtual DCU package/virtual ECU package to be shuffled to a new placement location at a different virtual DCU or virtual ECU associated with a customer account of the OEM manufacturer, OEM parts manufacturer, or third party, wherein the different virtual DCU or virtual ECU at the new placement location has different capabilities than a previous virtual DCU or virtual ECU at a previous placement location, such as a different latency, a different computing capacity, a different data storage capacity, a different ability to access stored data or share data with other service provider network services, etc. Also, in some embodiments a customer of a virtual DCU/ECU service, such as the OEM manufacturer, OEM parts manufacturer, or third party, may upgrade or downgrade an existing virtual DCU or an existing virtual ECU to have a different latency, a different computing capacity, a different data storage capacity, a different ability to access stored data or share data with other service provider network services, etc. For example, in some embodiments a virtual DCU or virtual ECU executing a vehicle code package for a vehicle consumer may be upgraded or downgraded without the vehicle code package having to be relocated to a new placement location. As an example, a virtual DCU/virtual ECU placed at a wireless network edge location may be upgraded or downgraded to have a greater or lesser data storage allocation without necessarily requiring a new placement in a different placement location, such as at a regional placement location. In some embodiments, upgrading or downgrading a virtual DCU or virtual ECU at a given placement location may nevertheless comprise changing a physical computing device at the placement location (e.g. edge network location, regional network location, etc.) that instantiates the execution thread for executing the code included in the vehicle code package/virtual DCU package/virtual ECU package.

In some embodiments, sets of virtual ECUs and/or a virtual DCU (locally implemented, remotely implemented, or both) may be grouped together to perform more sophisticated functions. For example, in some embodiments, an output of a first virtual ECU may be an input to another virtual ECU. Also, in some embodiments, a remote or local virtual DCU/ECU orchestration environment may be configured to share, via a network connection, at least some vehicle data or virtual DCU/ECU execution data with other virtual DCUs/ECUs implemented in other virtual DCU/ECU orchestration environments and/or with a storage service or other cloud service of a provider network via a network connection. For example, sensor data from a vehicle may be provided, via a virtual ECU, to a machine learning service of a service provider network to determine improved control relationships, wherein the results of the machine learning are then used to implement a new function or vehicle code package for the vehicle. In some embodiments, machine learning may be used in loop with a control algorithm executing on a virtual ECU (local or remote) for a vehicle, or may be used to determine control relationships that are then converted into static, auditable code to be deployed to the vehicle, such as via new vehicle code packages. Also, in some embodiments, clients, such as OEMs, may operate data storage facilities and virtual DCU/ECU orchestration environments, either located in a vehicle or remotely located, may be configured to share, via a network connection, at least some of the vehicle data and/or virtual DCU/ECU execution data with an OEM data storage facility.

In some embodiments, vehicle code packages/virtual DCU packages/virtual ECU packages may be developed and controlled by an OEM manufacturer and/or an OEM parts manufacturer to guarantee vehicle code packages/virtual ECU packages deployed to vehicles manufactured by the OEM or OEM parts manufacturer satisfy particular quality and/or certification requirements. Also in some embodiments, the OEM manufacturer and/or the OEM parts manufacturer may control virtual DCUs/ECUs that execute the vehicle code packages/virtual DCU packages/virtual ECU packages. For example, an OEM may maintain a customer account with a virtual DCU/ECU service for a fleet of virtual DCUs and/or virtual ECUs to be used to execute vehicle code packages for vehicles of the OEM manufacturer that include features implemented using virtual DCU/ECUs. While in other embodiments, other third parties may be enabled to develop and deploy new types of vehicle code packages into vehicles manufactured by another party, such as the OEM or multiple different OEMs.

Also in some embodiments, consumers of a vehicle may maintain their own customer account with the virtual DCU/ECU service or may indirectly maintain a customer account with the virtual DCU/ECU service through the OEM manufacturer or a third party. In such embodiments, vehicle data, consumer preferences, history data, etc. may be associated with the customer account tied to the individual consumer and may persist outside of the relationship between the individual consumer and the OEM manufacturer. For example the individual consumer can cause the data associated with the individual consumer's account to be used to improve vehicle code packages for other vehicles of the consumer that offload the vehicle code packages to the virtual DCU/ECU service. Also, the consumer's data may persist beyond a relationship with the OEM, such that when the individual consumer purchases a new vehicle manufactured by the OEM manufacturer or another vehicle manufacturer, the consumer can cause the data associated with the individual consumer's account to be used to improve vehicle code packages received from the new vehicle of the consumer at the virtual DCU/ECU service.

In some embodiments, various domains or operating systems included in a vehicle may include an infotainment domain/OS, a cockpit or control domain/OS, a communications domain/OS, a safety system domain/OS, a vehicle server domain/OS, a telematics communication unit domain/OS, an advanced drive assistance system domain/OS, a cloud domain/OS, an edge processing domain/OS (which may be implemented in part in a cellular communications tower, etc.), and/or a gateway domain/OS. The vehicle may include a common communications bus, but the different domains may be separate branches off of the bus, or data flowing over the bus may not be accessible in all of the domains. In some embodiments, a virtual DCU/ECU orchestration environments may receive and provide data to one or more of these domains.

FIG. 1 illustrates virtual domain control units (virtual DCUs) and virtual electronic control units (virtual ECUs) that execute code associated with a vehicle in a local virtual DCU/ECU orchestration environment at the vehicle and also execute code associated with the vehicle in remote virtual DCU/ECU orchestration environments remote from the vehicle, according to some embodiments.

Service provider network 102 implements virtual domain control unit (DCU) service 104, and service provider network services such as service provider network service 120 and service provider network service 128. In some embodiments, service provider network 102 may comprise one or more data centers in one or more regions of the service provider network that each comprise computing, data storage, networking and/or other devices that implement the service provider network 102. For example, service provider network service 120 includes/is implemented using data center computing devices 122 and data center storage devices 124. In a similar manner, service provider network service 128 includes/is implemented using data center computing devices 130 and data center storage devices 132. In some embodiments, data center computing devices and data center storage devices may include rack-mounted computing devices such as servers mounted in a data hall of a data center.

Virtual domain control unit service 104 may be implemented using resources of other services of service provider network 102, such as using computing resources of a computing service of the service provider network and using data storage resources of a storage service of the service provider network 102, such as services of service provider network service 120 or 128.

In some embodiments, virtual domain control unit service 104 includes code/logic depository 106, mapping and annotation generator 110, service interface 108, vehicle communication interface 112, and remote virtual DCU/ECU orchestration environment 114. Note that in some embodiments, virtual domain control service 104 may be used to deploy code packages to virtual DCUs, virtual ECUs, or both. Also, in some embodiments, virtual domain control unit service 104 may be used by a customer of the virtual DCU service 104 to reserve, allocate, de-allocate and manage virtual DCUs, virtual ECUs, or both.

In some embodiments, the service interface of a virtual DCU/ECU service, such as service interface 108, may implement a service console, an application programmatic interface configured to receive vehicle code package/virtual DCU package/virtual ECU package instructions from clients through a command line interface, a graphical user interface, or other suitable interface that enables clients to select and/or design new vehicle code packages/virtual DCU packages/virtual ECU packages to be deployed to vehicles that include virtual DCU/ECU orchestration environments. Note in some embodiments, a vehicle, such as vehicle 152, may be manufactured to include virtual DCU/ECU local orchestration environment 156 at the time of manufacture, wherein the virtual DCU/ECU local orchestration environment 156 enables new vehicle code packages/virtual DCU packages/virtual ECU packages to be deployed to vehicle 152 subsequent to manufacture and subsequent to being put into use by an owner or operator of the vehicle 152.

In some embodiments, a console implemented by service interface 108 may provide clients, such as clients 406*a* through 406*n* as illustrated in FIG. 4, with a list of available component inputs/outputs of a vehicle, such as sensors, DCUs, ECUs, actuators, etc. that are included in a vehicle and that may be used as inputs or output of a new vehicle code package, new virtual DCU package or a new virtual ECU package. For example, a physical sensor list may store updated lists of available sensors that are included in various types of vehicles that are available for use by the virtual DCU/ECU local orchestration environment 156. Also, a console implemented by service interface 108 may provide clients with available rules, models, etc. that may be used to design a new vehicle code package/a new virtual DCU package/a new virtual ECU package, etc. For example, code logic depository 106 may store logic elements such as available rules, models, etc. that may be used to define code logic for a new vehicle code package/a new virtual DCU package/a new virtual ECU package, etc. Additionally, in some embodiments clients may submit client generated rules, models, etc. to be used in a new vehicle code package/virtual DCU package/virtual ECU package, etc. In some embodiments, service interface 108 may provide a "drag and drop" graphical user interface (GUI), wherein a client drags and drops logic elements, such as rules models, etc. to be used in a new vehicle code packages and further defines a data flow through a virtual DCU or virtual ECU that implements the new vehicle code package by drawing lines connecting inputs to the logic elements and further connecting the logic elements to one or more outputs of the vehicle code package. In some embodiments, a client may select from pre-defined logic elements to drag and drop to define a new vehicle code package, or the client may provide a client defined logic element to drag and drop and to further connect with other code elements, inputs, outputs, etc. to define a new vehicle code package.

In some embodiments, mapping and annotation generator 110 may then generate a package as defined by the client via service interface 108 to be deployed to a vehicle. In some embodiments, the client may specify annotations to be included with the vehicle code package, such as requirements for a virtual DCU or virtual ECU that is to execute/implement the vehicle code package, or mapping and annotation generator 110 may automatically determine annotations based on the vehicle code/virtual DCU package/virtual ECU package definition received via service interface 108.

In some embodiments, an application may request a new vehicle code package be deployed in order to enable the application to be implemented and an application interface of service interface 108 may receive such a request.

In some embodiments, vehicle communication interface 112 may establish a network connection with in-vehicle computing device(s) 154 and may transmit a V-DCU or V-ECU package to the virtual DCU/ECU orchestration environment 156 for deployment.

In some embodiments, in-vehicle computing device(s) 154 may implement local virtual DCU/ECU orchestration environment 156, and the local virtual DCU/ECU orchestration environment 156 may span one or more operating system domains of vehicle 152, such as operating system domains 158 through 160. In some embodiments, each operating system domain may be implemented on a separate in-vehicle computing device (such as separate DCUs), or may be implemented on a common in-vehicle computing device. Also, in some embodiments, local virtual DCU/ECU orchestration environment 156 may be implemented on a same in-vehicle computing device as one or more of the operating system domains, or may be implemented on a separate in-vehicle computing device that interfaces with other in-vehicle computing devices implementing the respective operating system domains 158 through 160. Also, in some embodiments, a vehicle may include a communication bus 172 that connects the in-vehicle computing device(s) 154 to physical components, such as physical sensor 166, physical ECU 168, and physical output device 170. In some embodiments, one or more different types of interfaces 174 may connect the physical components to the communication bus 172. Also, in some embodiments, local virtual DCU/ECU orchestration environment 156 may implement one or more virtual DCUs/virtual ECUs, such as virtual DCU 162 and virtual ECU 164. In some embodiments the virtual DCU 162 and virtual ECU 164 may be implemented in a particular operating system domain, or may be allowed to communicate with other portions of the vehicle via a communication bus, such as communication bus 172.

In some embodiments, the local virtual DCU/ECU orchestration environment may determine placement locations for vehicle code packages/virtual DCU packages/virtual ECU packages. In some embodiments, the vehicle code packages/virtual DCU packages/virtual ECU packages may be placed in different ones of the operating system domains 158 through 160 using the local virtual DCU/ECU orchestration environment 156. Also, the vehicle code packages may be placed at remote virtual DCU/ECUs that are configured to communicate with vehicle. For example, a vehicle code package may be placed at virtual ECU 116 or virtual DCU 118 included in a service provider network region and implemented in virtual DCU/ECU remote orchestration environment 114. As another example, a vehicle code package may be placed at virtual DCU 148 or virtual ECU 150 included in wireless network edge location 138 that also includes wireless communication devices 140 that establish a wireless connection 176 with vehicle 152. Note that wireless connection 176 is directly between wireless edge location 138 and vehicle 152, whereas a connection 178 to a data center hosting computing devices that implement virtual DCU/ECU remote orchestration environment 114 may include intermediate networking devices/hops via network 136. For example, in some embodiments, service provider edge computing devices 142 and service provider edge storage devices 144 may be co-located at a wireless edge location that includes wireless communication devices 140. As a further example, wireless communication devices 140 may be wireless antenna that implement a 5G wireless network and service provider edge computing devices 142 and service provider edge storage devices 144 may be physically located in a same or adjacent facility as the wireless antenna. Also, the service provider edge computing devices 142 and service provider edge storage devices 144 may implement the virtual DCU/ECU edge orchestration environment 146.

In some embodiments, a virtual DCU/ECU orchestration environment, such as local virtual DCU/ECU orchestration environment 156, virtual DCU/ECU edge orchestration environment 146, and virtual DCU/ECU remote orchestration environment 114 may. in response to a placement decision to place a vehicle code package in the respective virtual DCU/ECU orchestration environment, instantiate an execution thread on a virtual DCU/ECU located at the virtual DCU/ECU orchestration environment, execute code included in the vehicle code package using the execution thread implemented on the local virtual DCU/ECU, and provide results of executing the code to components at the vehicle, such as physical ECU 168, physical output device 170, etc. Also, the results may be provided to other virtual DCUs/ECUs located at other locations such as virtual DCU 162 or virtual ECU 164 located locally at the vehicle, virtual DCU 148 or virtual ECU 150 located at the wireless network edge, or virtual ECU 116 or virtual DCU 118 located in a data center of a region of the service provider network 102.

In some embodiments, outputs from one or more first virtual DCUs or virtual ECUs may be inputs to other virtual DCUs or virtual ECUs in a same or different location. In this way a network of virtual DCUs/ECUs may be formed such that tasks that require low latencies are executed locally at a virtual DCU/ECU at the vehicle or at a wireless network edge location, while other tasks that are not as sensitive to latencies may be executed using a virtual DCU/ECU at a remote region data center, such as virtual ECU 116 and/or virtual DCU 118. Also, in some embodiments a virtual DCU/ECU may outsource tasks or jobs to other services of service provider network 102. For example V-DCU task/job 126 has been outsourced by virtual DCU 118 to service provider network service 120. Also, V-ECU task/job 134 has been delegated to service provider network service 134. For example, in some embodiments, virtual DCU 148 or virtual ECU 150 at the wireless network edge location may have delegated V-ECU task/job 134 to service provider network service 128.

In some embodiments, a remote execution environment for a vehicle code package may implement/use a standardized coding paradigm, such that developers of vehicle code packages to be executed via virtual DCUs/ECUs may use a common coding paradigm to develop vehicle code packages to be deployed to vehicles manufactured by different manufacturers and/or to be placed at different virtual DCU/ECU orchestration environments located in different locations (e.g. local, edge, remote, etc.).

Figure 2:
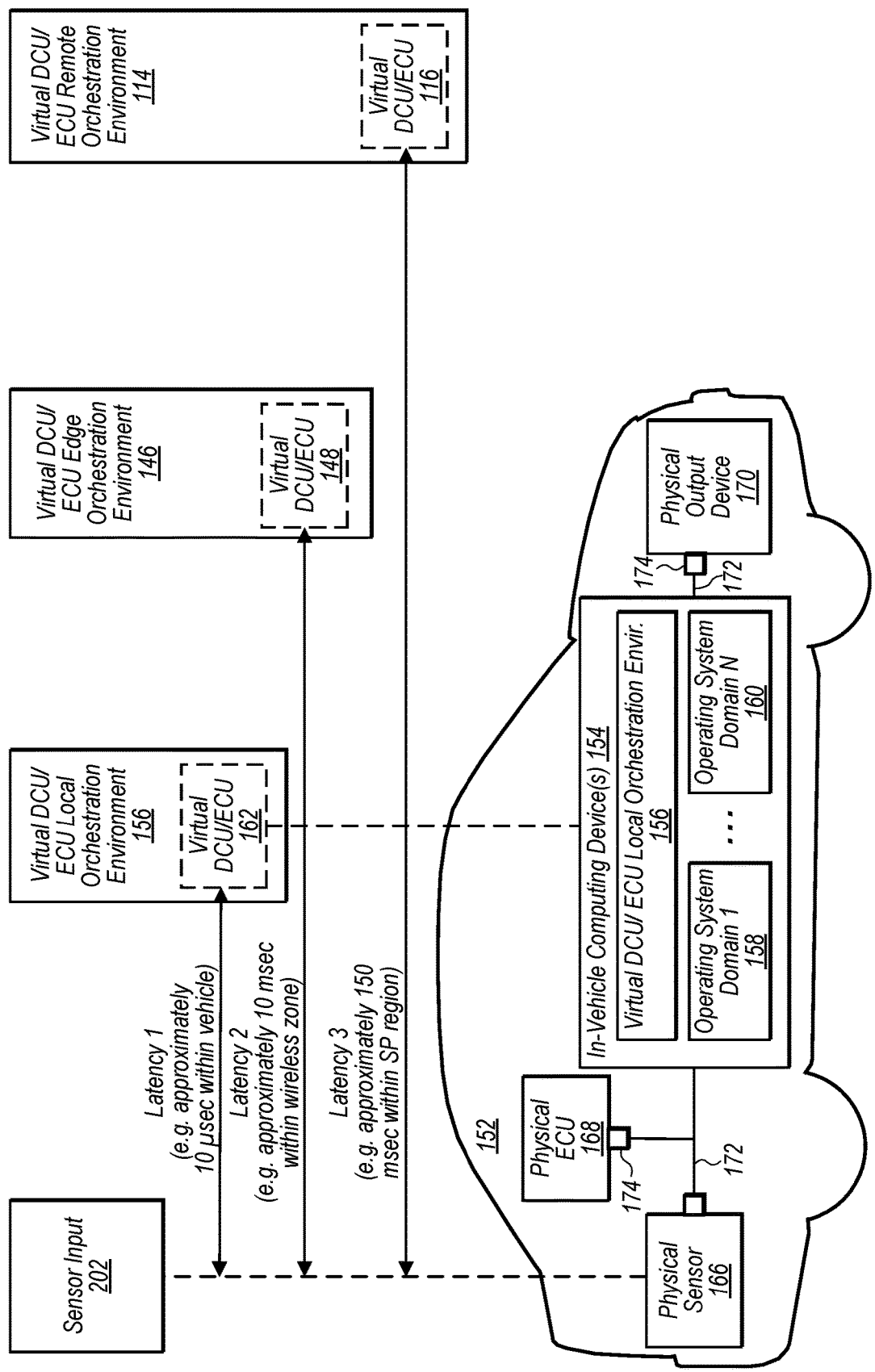
FIG. 2 illustrates example one-way trip latencies between a physical component of the vehicle, such as a sensor, and virtual DCUs/ECUs implemented at different locations relative to the vehicle, according to some embodiments.

FIG. 2 illustrates example one-way trip latencies between a physical component of the vehicle, such as a sensor, and virtual DCUs/ECUs implemented at different locations relative to the vehicle, according to some embodiments.

As discussed above, in some embodiments, a placement for a vehicle code package/virtual DCU package/virtual ECU package may be selected based on latency requirements of the vehicle code. For example, some types of code may require low latencies between vehicle components, such as physical sensor 166 and physical output device 170. For example, an application implemented using vehicle code that detects an obstacle in the road may require low latencies between a sensor and an output device. However, as another example, an application that adjusts a seat position for a passenger when the passenger enters the vehicle may be able to tolerate a higher latency. As yet another example, an application that, for example, provides song recommendations, may not be sensitive to latency to similar degree as other applications. In these different examples, a vehicle code package for the applications may indicate latency requirements and the vehicle code packages comprising code to implement these applications may be placed on virtual DCUs/ECUs at different locations that provide different levels of latency and or/different capacities, such as different computing capacity, different storage, capacity, different access to other provider network services, etc.

Continuing the example, a vehicle code package for the application for identifying and responding to an obstacle in the road may indicate that the one-way latency is required to be less than a millisecond, or alternatively may indicate the two way latency, e.g. the latency from when the sensor generates a signal to when the output device receives a signal determined using the code of the application. For simplicity, the following discussion is in terms of a one-way latency, but in some embodiments, vehicle code packages and placement decisions could also be performed based on two-way latencies.

In the example of the vehicle code package for the application for identifying and responding to an obstacle in the road, the virtual DCU/ECU local orchestration environment 156 may determine that the vehicle code package needs to be placed locally, for example at virtual DCU/ECU 162 in order to meet the latency requirements of the vehicle code package. For example, in some embodiments, a local virtual DCU/ECU orchestration environment may provide one-way latencies, such as between sensor 166 and virtual ECU 162 in the range of 10 micro-seconds.

With regard to the example for an application for adjusting a seat position for a passenger when the passenger enters the vehicle, latency may be important such that the passenger is not waiting 10 seconds, 30 seconds, etc. for the seat to be adjusted. But at the same time, it may not be significant if the passenger waits half a second versus a quarter of second, etc. For example purposes, such an application with a medium latency requirement may be implemented using a virtual DCU/ECU implemented at an edge of a wireless network connected to the vehicle, such as virtual DCU/ECU 148 at virtual DCU/ECU edge orchestration environment 146. In some embodiments, edge computing devices and edge data storage devices that are co-located at an edge of a wireless network may provide more computing and/or data storage capacity than is available on in-vehicle computing devices 154, but may have less computing and/or data storage capacity than is available in a region network data center and/or may include more costly computing and/or data storage resources than are available in a region network data center. For example, an amount of data storage necessary to store the seat preferences of the passenger may be sufficiently small such that it makes sense to store this data in an edge data storage device located in an edge facility that includes computing devices that implements virtual DCU/ECU edge orchestration environment 146.

With regard to the example of an application for providing song recommendations, the application may require access to a large amount of stored data, such as a library of songs, past customer choices, etc., other service provider services, such as a machine learning service, and/or more computing power. Though possible, it may not be economical or feasible to implement such an application locally on the in-vehicle computing device 154. Also lower costs or economies of scale may make it more desirable to implement such an application at a region network location that has ready access to more compute and storage capacity and/or access to persistently stored data and/or other service provider services. Therefore, a placement decision may be made to place a vehicle code package including code for an application that provides song recommendations at virtual DCU/ECU 116 implemented at virtual DCU/ECU remote orchestration environment 114.

Also, as shown in FIG. 2, in some embodiments a one way latency from a sensor to a virtual DCU/ECU at an edge wireless network location may be in the range of 10 milliseconds.

In some embodiments, a remote virtual DCU/ECU orchestration environment may have a one-way latency in the range of 150 milliseconds, which may be satisfactory for song recommendations, as an example of an application with higher storage or compute requirements but less sensitivity to latency.

Figure 3:
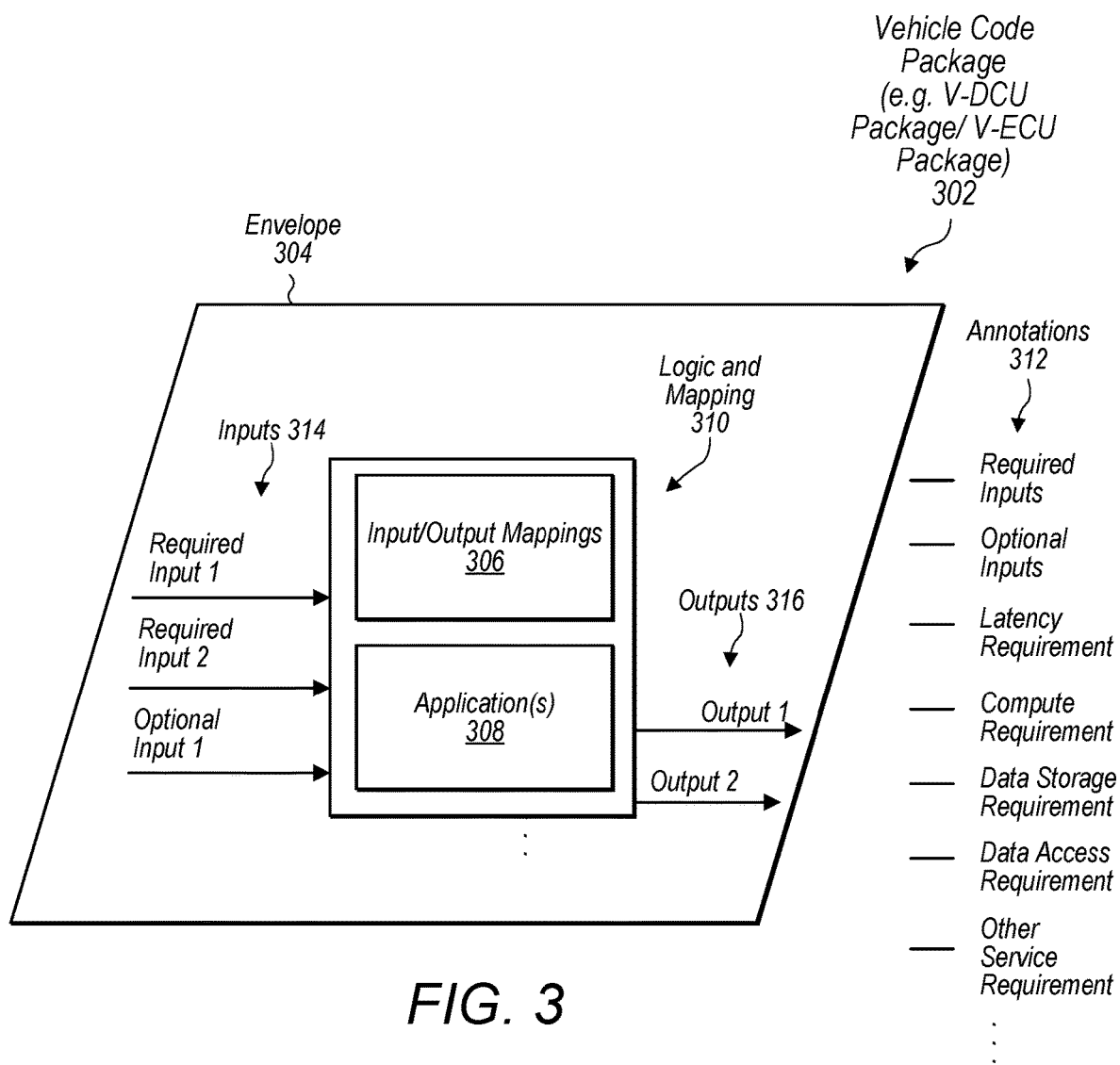
FIG. 3 illustrates an example vehicle code package/virtual DCU code package/virtual ECU code package that is formatted in an enveloped format with annotations indicating requirements for placement of the vehicle code package/virtual DCU code package/virtual ECU code package on a virtual DCU/ECU orchestration environment meeting the indicated requirements, according to some embodiments.

FIG. 3 illustrates an example vehicle code package/virtual DCU code package/virtual ECU code package that is formatted in an envelope with annotations indicating requirements for placement of the vehicle code package/virtual DCU package/virtual ECU package on a virtual DCU/ECU meeting the indicated requirements, according to some embodiments.

In some embodiments, a vehicle code package/virtual DCU package/virtual ECU package, such as vehicle code package/virtual DCU package/virtual ECU package 414 described in FIG. 4 or any of the vehicle code packages/virtual DCU packages/virtual ECU packages described in any other ones of the figures, may include a similar format as the format described in FIG. 3 for vehicle code package/virtual DCU package/virtual ECU package 302.

Vehicle code package/virtual DCU package/virtual ECU package 302 includes an envelope 304 that envelopes code defining logic and mapping 310. Also, outside of the envelope 304, vehicle code package/virtual DCU package/virtual ECU package 302 includes annotations 312. In some embodiments, annotations may include required inputs for a vehicle code package/virtual DCU package/virtual ECU package, optional inputs for the vehicle code package/virtual DCU package/virtual ECU package, latency requirements for the vehicle code package/virtual DCU package/virtual ECU package, computing capacity requirements for the vehicle code package/virtual DCU package/virtual ECU package, data storage requirements for the vehicle code package/virtual DCU package/virtual ECU package, data access requirements for the vehicle code package/virtual DCU package/virtual ECU package, other service requirements for the vehicle code package/virtual DCU package/virtual ECU package, certification level(s) of the vehicle code package/virtual DCU package/virtual ECU package, failure contingency plans for the vehicle code package/virtual DCU package/virtual ECU package, dependency chains for the vehicle code package/virtual DCU package/virtual ECU package, etc.

In some embodiments, a failure contingency plan may indicate an alternative input to be used by the code executing the vehicle code package/virtual DCU package/virtual ECU package if a particular required or optional input is not available. Also, the certification levels and/or failure contingency plans may indicate different certification levels to be attributed to a virtual DCU or virtual ECU that implements the vehicle code package/virtual DCU package/virtual ECU package based on how many required and/or optional inputs are available. Also, a certification level for a virtual DCU or virtual ECU that implements the vehicle code package/virtual DCU package/virtual ECU package may depend on a domain in which the virtual ECU is implemented or the domain of the virtual DCU. For example, hardware used in a safety domain may be more robust than hardware used in an entertainment domain. Thus, in order to achieve a higher level of certification the vehicle code package may need to be implemented in a domain that includes more robust hardware, or lower latency hardware, that meets requirements for a given certification level. Also a latency of the placement location may affect a level of certification the vehicle code package.

In some embodiments, logic and mapping 310 may include input/output mappings 306 and application(s) 308. In some embodiments, applications 308 may run in a base software of the virtual DCU or virtual ECU at which the vehicle code package/V-DCU/V-ECU package 302 is placed.

In some embodiments, annotations 312 may additionally indicate that the vehicle code package/virtual DCU package/virtual ECU package outputs 316 are an input to another virtual DCU, virtual ECU and/or may indicate that an output from another virtual DCU or virtual ECU is a required or optional input to the given vehicle code package/virtual DCU package/virtual ECU package. In some embodiments, the annotations may indicate a particular operating system domain in which a vehicle code package/virtual ECU package is to be deployed. For example, to achieve a particular certification level the vehicle code package/virtual ECU package may need to be deployed in an operating system domain with hardware or processes that satisfy requirements of the particular certification level.

Also annotations, such as annotations 312, may indicate that when one or more optional inputs are available to a virtual ECU that implements the vehicle code package/virtual ECU package, the virtual ECU can be upgraded to a higher certification level. In some embodiments, a virtual DCU/ECU orchestration environment may scan annotations of already implemented code packages when a new code package is added to determine if a given code package has an output that is an optional input to one or more of the already implemented code packages. Also, the virtual DCU/ECU orchestration environment may automatically change a placement of one or more code packages (e.g. re-shuffle the code packages) such that given ones of the code packages can be upgraded to higher certification levels by taking advantage of the output of the newly added code packages as an input to the one or more already implemented code packages. In some embodiments, the upgrade of a virtual ECU/code package certification level may further allow other code packages to be upgraded by receiving an input (output from the upgraded virtual ECU/code package) that complies with a higher certification level. Also, in addition to re-shuffling based on changes in available inputs, re-shuffling may also be performed in response to changes in latencies, available computing capacities, storage capacities, etc. in the different virtual DCU/ECU orchestration domains.

In some embodiments, an OEM submitting a vehicle code package/virtual DCU package/virtual ECU package 302 may define requirements included in annotations 312. In some embodiments default requirements may be used and/or a virtual DCU/ECU service may determine the requirements.

Figure 4A:
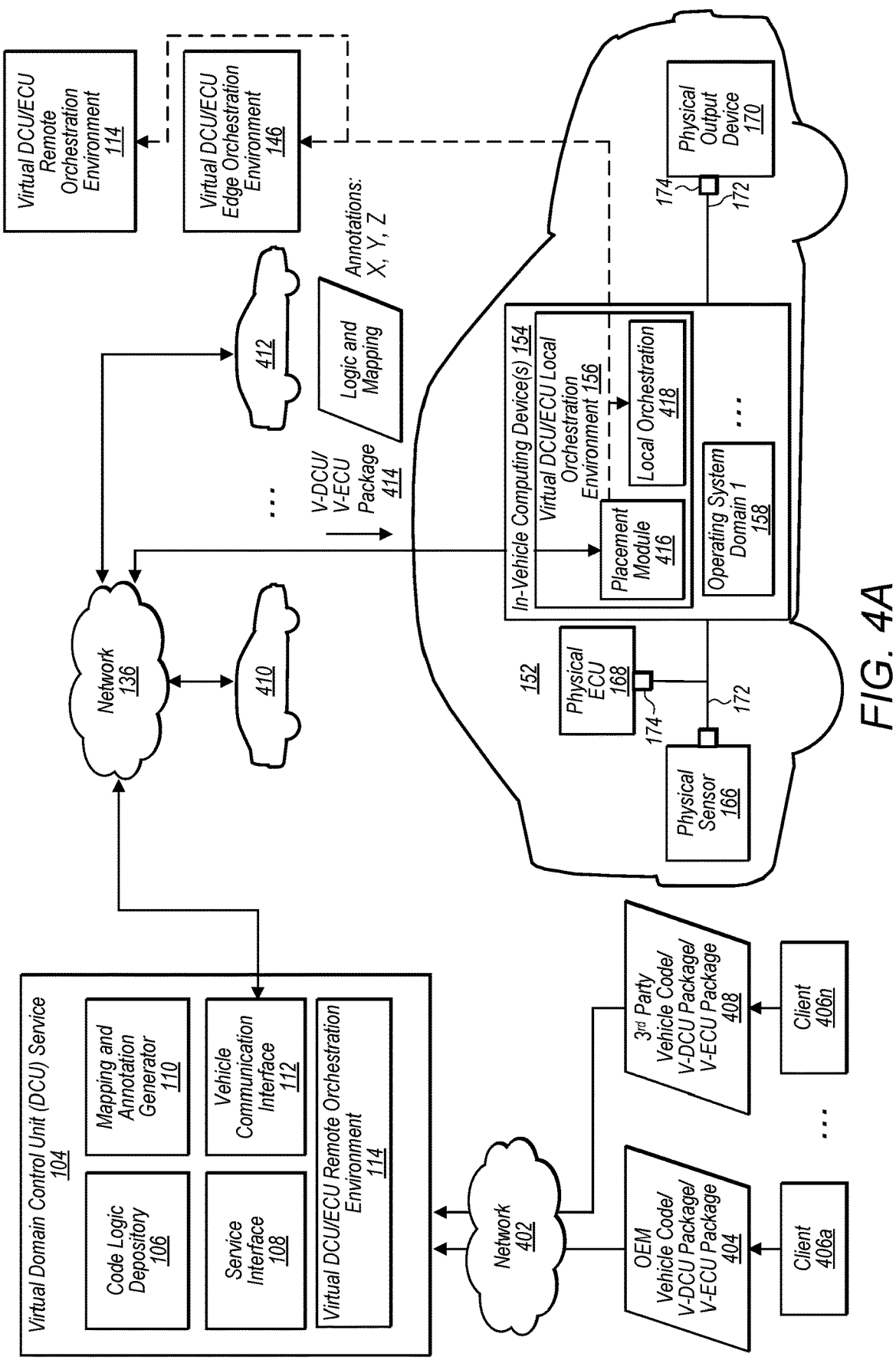
FIG. 4A illustrates a virtual ECU service that receives instructions for deploying a vehicle code package/virtual DCU code package/virtual ECU code package from clients of the virtual ECU service and that remotely causes the vehicle code package/virtual ECU package to be deployed to a local or remote virtual ECU orchestration environment for execution, wherein a placement decision is determined locally at the vehicle, according to some embodiments.

FIG. 4A illustrates a virtual ECU service that receives instructions for deploying a vehicle code package/virtual DCU package/virtual ECU package from clients of the virtual DCU/ECU service and that remotely causes the vehicle code package/virtual DCU package/virtual ECU package to be deployed to a local or remote virtual DCU/ECU orchestration environment for execution, according to some embodiments.

In some embodiments, clients of a virtual DCU/ECU service 104, such as clients 406a through 406n may interact with service interface 108 to submit/define new vehicle code packages to be deployed to a fleet of vehicles associated with the respective client. For example, client 406a is an OEM, and may submit an OEM vehicle code package/V-DCU/V-ECU package 404 to be implemented on vehicles manufactured by the OEM. As another example, client 406n may be a third-party and may submit third party vehicle code package/virtual DCU package/virtual ECU package 408 to be implemented on vehicles operated by customers of the third party client 406n. In response, vehicle communication interface 112 may provide V-ECU/V-DCU package 414 to vehicles 410, 152, 412, etc. that are customers of the respective client submitting the vehicle code package/virtual DCU package/virtual ECU package.

In some embodiments, the V-DCU/V-ECU package 414 may be received by a placement module 416 of virtual DCU/ECU local orchestration environment 156. The placement module may determine based on latencies/capacities of available placement locations and requirements of the V-DCU/V-ECU package 414 where to place the package. For example, the V-DCU/V-ECU package 414 may be placed at local virtual DCU/ECU orchestration environment 418, remote virtual DCU/ECU orchestration environment 114, or edge virtual DCU/ECU orchestration environment 146. In some embodiments, placement decisions may be made by virtual DCU/ECU service 104 and the V-DCU/V-ECU package 414 may be sent directly to a selected placement location instead of first being sent to vehicle 152.

In some embodiments, virtual DCU/ECUs at remote virtual DCU/ECU orchestration environment 114 and virtual DCU/ECUs at edge virtual ECU orchestration environment 146 may be associated with a respective customer account of clients 406a through 406n, wherein the client, such as an original vehicle provider, maintains the customer account associated with V-DCUs and/or V-ECUs that perform applications for vehicles of the original equipment provider (e.g. OEM).

In some embodiments, virtual DCU/ECUs at remote virtual DCU/ECU orchestration environment 114 and virtual DCU/ECUs at edge virtual DCU/ECU orchestration environment 146 may be associated with a respective customer account of consumers of vehicles, wherein the consumers have an account that persists outside of the relationship with the original equipment provider. Thus, a consumer of a vehicle may have data or preferences stored and associated with the vehicle consumer's customer account, such that the data and preferences can be made available to applications implemented at virtual DCU/ECUs for other vehicles owned or operated by the consumer, even if manufactured by a different OEM.

Also, in some embodiments, clients such as clients 406a through 406n and/or a vehicle consumer client may upgrade a virtual DCU/ECU associated with the client's customer account to have more allocated compute capacity, storage capacity, network bandwidth, etc. to further improve performance of applications.

In some embodiments, placement module 416 may place a vehicle code package/virtual DCU package/virtual ECU package at a virtual DCU or virtual ECU with a lowest latency of a set of virtual DCUs or virtual ECUs that otherwise meet requirements of the vehicle code package/virtual DCU package/virtual ECU package. For example, all other aspects being equal, the lowest latency virtual DCU/ECU placement location may be selected.

Figure 4B:
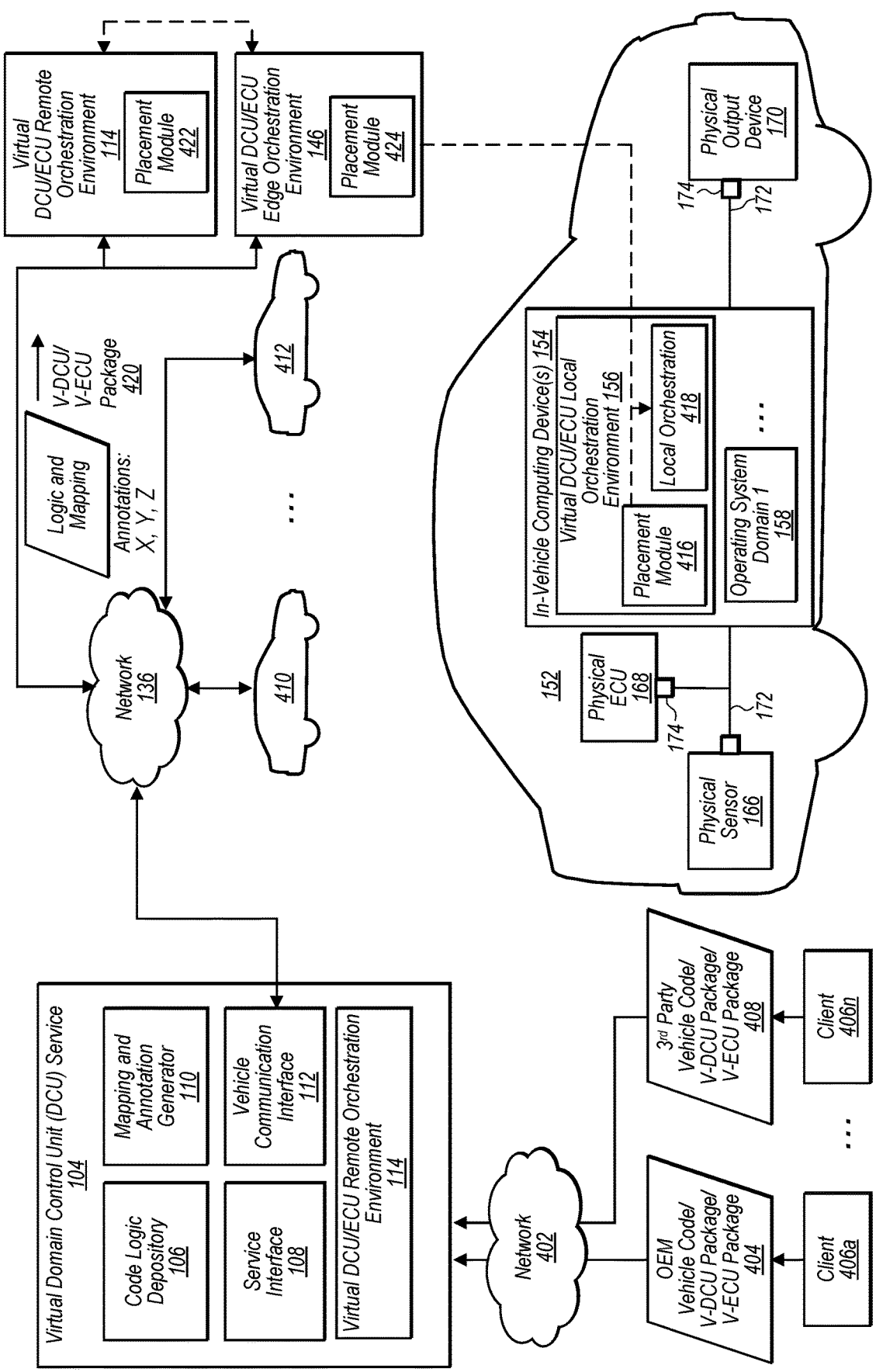
FIG. 4B illustrates a virtual DCU/ECU service that receives instructions for deploying a vehicle code package/virtual DCU package/virtual ECU package from clients of the virtual DCU/ECU service and that remotely causes the vehicle code package/virtual DCU package/virtual ECU package to be deployed to a local or remote virtual DCU/ECU orchestration environment for execution, wherein a placement decision is determined remotely, according to some embodiments.

FIG. 4B illustrates a virtual DCU/ECU service that receives instructions for deploying a vehicle code package/virtual DCU package/virtual ECU package from clients of the virtual DCU/ECU service and that remotely causes the vehicle code package/virtual DCU package/virtual ECU package to be deployed to a local or remote virtual DCU/ECU orchestration environment for execution, wherein a placement decision is determined remotely, according to some embodiments.

In some embodiments, placement for a vehicle code package/virtual DCU package/virtual ECU package, such as V-DCU/V-ECU package 420, may be determined remotely from vehicle 152. For example, V-DCU/V-ECU package 420 may be deployed from virtual DCU/ECU service 104 to virtual DCU/ECU remote orchestration environment 114 or virtual DCU/ECU edge orchestration environment 146. In some embodiments, the remote or edge virtual orchestration environments may implement a placement module for a customer account associated with the vehicle code package/virtual DCU package/virtual ECU package. For example, virtual DCU/ECU remote orchestration environment 114 implements placement module 422 and virtual DCU/ECU edge orchestration environment 146 implements placement module 424. In some embodiments, the in-vehicle computing devices 154 may additionally implement a local placement module 416 at the local virtual DCU/ECU orchestration environment 156, or in some embodiments, the local placement module 416 may be omitted. Also, in some embodiments a remote placement module may be implemented at one of the remote/edge virtual DCU/ECU orchestration environments, without being required to be implemented at all remote/edge virtual DCU/ECU orchestration environments. For example, in some embodiments a placement module may determine placements for vehicle code package/virtual DCU packages/virtual ECU packages at a plurality of other placement locations. Also, in some embodiments, virtual DCU/ECU service 104 may be implemented at a same physical site as virtual DCU/ECU remote orchestration environment 114 or virtual DCU/ECU edge orchestration environment 146, such as in a same data center.

In some embodiments, a remote placement module may push a vehicle code package/virtual DCU package/virtual ECU package to a more local placement location if a remote placement location of the remote placement module cannot satisfy a latency requirement of the vehicle code package/virtual DCU package/virtual ECU package. Also, if a more remote placement location satisfies requirements of a vehicle code package/virtual DCU package/virtual ECU package, such as latency, a given remote placement module may push a vehicle code package/virtual DCU package/virtual ECU package to a more remote placement location to free up capacity at closer remote locations for use by other vehicle code packages/virtual DCU packages/virtual ECU packages with more stringent latency requirements. For example, placement module 424 in the virtual DCU/ECU edge orchestration environment 146 may push vehicle code packages/virtual DCU packages/virtual ECU packages with less demanding latency requirements up to virtual DCU/ECU remote orchestration environment 114 for placement and may also push vehicle code packages/virtual DCU packages/virtual ECU packages with more demanding latency requirements down to placement in virtual DCU/ECU local orchestration environment 156 implemented in vehicle 152. Likewise, placement module 422 of virtual DCU/ECU remote orchestration environment 114 may push down vehicle code packages/virtual DCU packages/virtual ECU packages with more stringent latency requirements to either of virtual DCU/ECU edge orchestration environment 146 or virtual DCU/ECU local orchestration environment 156.

Figure 16:
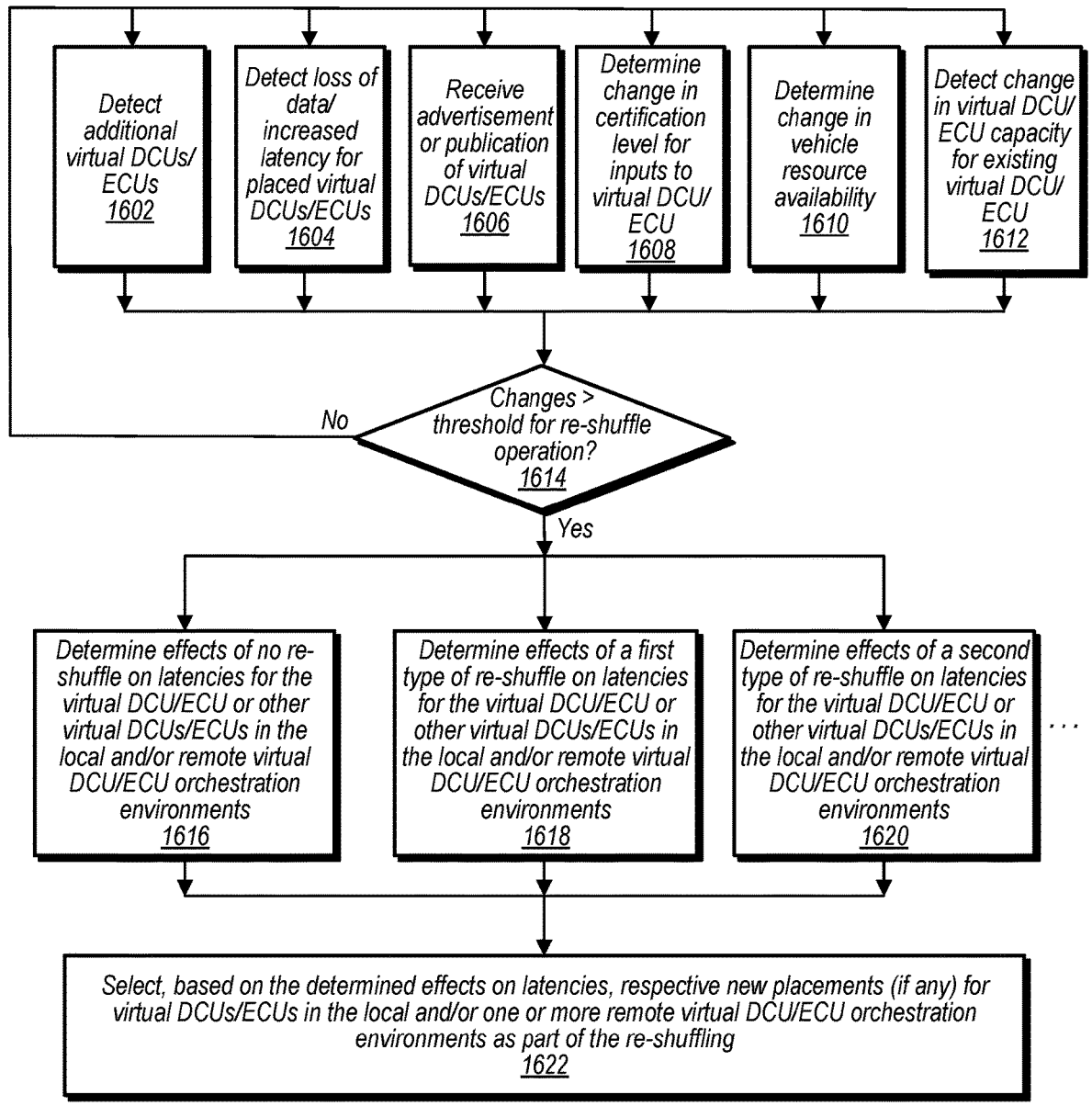
FIG. 16 illustrates a process for re-shuffling vehicle code package/virtual DCU package/virtual ECU package placements amongst two or more virtual DCU/ECU orchestration environments at local or remote locations in response to changes at the vehicle or in the remote virtual DCU/ECU orchestration environments, according to some embodiments.

Also, as further described in regard to FIG. 16, in response to changes in requirements for a vehicle code package/virtual DCU package/virtual ECU package and/or changes in respective ones of the virtual DCU/ECU orchestration environments, such as capacity and/or latency changes, a vehicle code package/virtual DCU package/virtual ECU package may be re-shuffled wherein a placement for the vehicle code package/virtual DCU package/virtual ECU package is updated to take into account the changed requirements and changed capacities/latencies of the orchestration environments.

Figure 5:
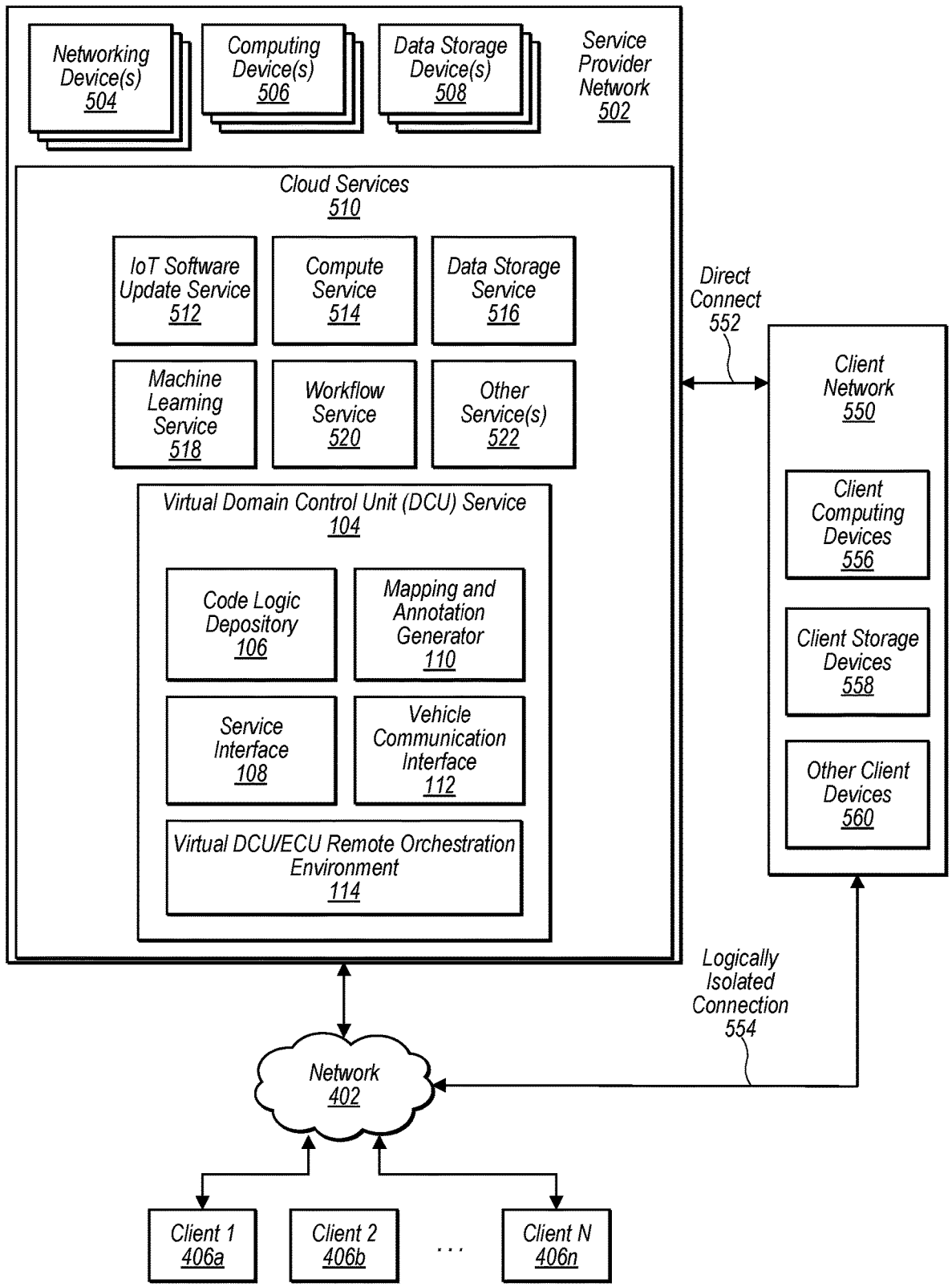
FIG. 5 illustrates an example provider network that includes a virtual DCU/ECU service as well as other cloud services offered by the provider network, according to some embodiments.

FIG. 5 illustrates an example provider network that includes a virtual DCU/ECU service as well as other cloud services offered by the provider network, according to some embodiments.

In some embodiments, a provider network, such as provider network 102, includes networking devices 504, computing devices 506, and data storage devices 508 that implement cloud services 510. In some embodiments, a provider network may implement a plurality of cloud services in addition to a virtual DCU/ECU service. For example, provider network 502 implements cloud services 510 that include IoT software update service 512, compute service 514, data storage service 516, machine learning service 518, workflow service 520, and other services 522. Cloud services 510 also includes virtual DCU/ECU service 104.

In some embodiments, an IoT software update service, such as IoT software update service 512, may facilitate software updates on devices connected to the IoT software update service, such as vehicles 152, 410, and 412 as illustrated in FIG. 4. In some embodiments, an IoT software update service may additionally update firmware on a connected device and may utilize encrypted communications to perform the update. In some embodiments, the IoT software update service may also include identity authentication protocols to prevent unauthorized entities from altering software on a connected device, such as a vehicle, and encrypt communications to the connected device to prevent alterations to the software updates.

In some embodiments, a compute service, such as compute service 514, may include computing devices that implement virtual compute machines that may be used to analyze collected vehicle data/virtual DCU/ECU execution data and/or may be used to implement a virtual DCU/ECU service.

In some embodiments, a data storage service, such as data storage service 516, may include data storage devices that implement a virtualized data storage, such as a virtual data storage volume or virtual storage containers for an object-based storage. In some embodiments, a data storage service, such as data storage service 516, may be used to store collected vehicle data and or virtual DCU/ECU execution data. Also, in some embodiments, a data storage service, such as data storage service 516, may be used to implement components of a virtual DCU/ECU service. For example, in some embodiments, code logic depository 106 may be implemented using virtual storage resources of data storage service 516. Also in some embodiments, data storage service 516 may persistently store data, such as vehicle data or virtual DCU/ECU execution data associated with a customer account.

In some embodiments, a machine learning service may execute one or more machine learning algorithms to determine relationships to be used in a virtual DCU/ECU orchestration environment (such as may be used by code packages executing on virtual DCUs/ECUs), to optimize a workflow service, or to optimize another service. For example, in some embodiments, a machine learning service, such as machine learning service 518, may be used to optimize software for a virtual DCU/ECU and may utilize collected vehicle data from a virtual DCU/ECU orchestration environment, such as virtual DCU/ECU orchestration environment 114, to perform such machine learning or to produce machine learning inference outputs.

In some embodiments, a workflow service, such as workflow service 520, may execute a workflow based on input data and a stored or developed workflow. For example, in some embodiments, a workflow service, such as workflow service 520, may determine actions to be taken based on vehicle data or virtual DCU/ECU execution data. In some embodiments, a vehicle code package executing at a virtual DCU/ECU may provide an output to workflow service 520. As an example, a workflow service may determine a filter, hose, or fluid needs to be changed or replaced based on applying collected vehicle usage information to one or more stored or developed work flows. In some embodiments, a machine learning service, such as machine learning service 518, may be used to develop or improve work flows executed by workflow service 520. In some embodiments, workflow service 520 may be connected to a networked set of virtual DCUs/ECUs at two or more different placement locations, and may provide inputs to code executing at the virtual DCUs/ECUs and/or receive outputs from code executing at the virtual DCUs/ECUs.

In some embodiments, cloud services 510 may include various other cloud services, such as other services 522.

In some embodiments, a virtual DCU/ECU service may be configured to establish a secure connection to a client network for delivering data from a virtual DCU/ECU service. For example, in some embodiments, an OEM may receive certain types of vehicle data for use in improving vehicle design and/or for use in developing new DCUs/ECUs. In some embodiments, a client network, such as an OEM network, may establish a secure connection to a virtual DCU/ECU service via a direct connection, such as direct connect 552, or via a logically isolated network connection, such as logically isolated network connection 554. In some embodiments, a direct connection may include a dedicated physical network link that links the client network 550 to the provider network 510 and/or one or more logically isolated network connections within provider network 510 that route traffic from a router physically connected to the client network 550 via direct connect 552 to computing devices and/or storage devices that implement the virtual DCU/ECU service 104. For example, connected car services 742, such as a data lake, as described in FIGS. 7-10 may be implemented using cloud services, such as compute service 514 and data storage service 516, or may be implemented directly by a client using client resources, such as client computing devices 556, client storage devices 558, or other client devices 560.

Figure 6:
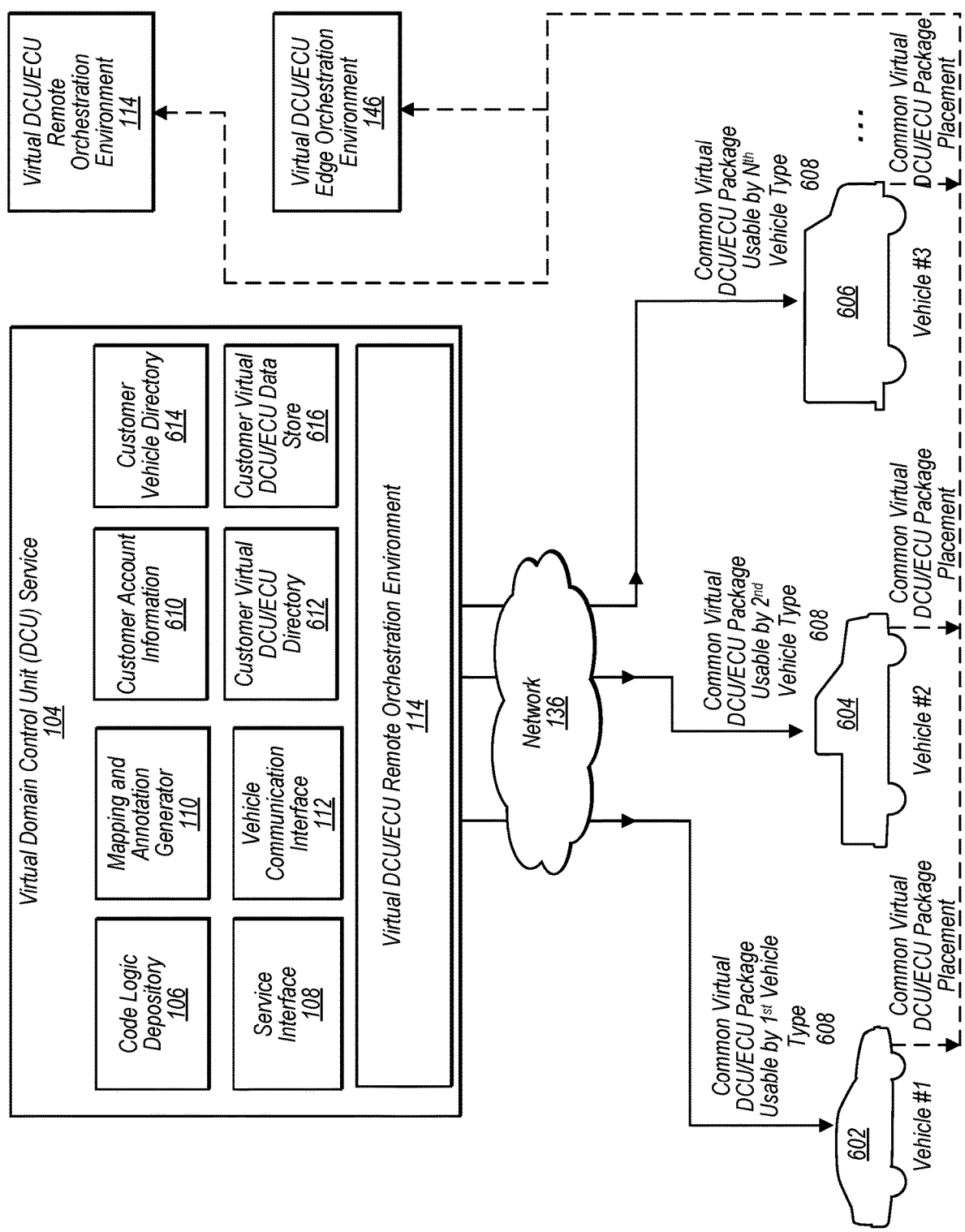
FIG. 6 illustrates a virtual DCU service that is configured to deploy a common vehicle code package to varying types of vehicles that each implement an in-vehicle virtual DCU/ECU orchestration environment, wherein the in-vehicle virtual DCU/ECU orchestration environments of the varying types of vehicles are configured place the common vehicle code package at one or more common remote virtual DCU/ECU orchestration environments, if remote placement is selected, according to some embodiments.

FIG. 6 illustrates a virtual DCU/ECU service that is configured to deploy a common vehicle code package to varying types of vehicles that each implement an in-vehicle virtual DCU/ECU orchestration environment, wherein the in-vehicle virtual DCU/ECU orchestration environments of the varying types of vehicles are configured to place the common vehicle code package at one or more common remote virtual DCU/ECU orchestration environments, if remote placement is selected, or place the common vehicle code package at a local virtual DCU/ECU orchestration environment if local placement is selected, according to some embodiments.

In some embodiments, virtual DCU/ECU orchestration environments may follow a standardized paradigm such that a virtual DCU/ECU service, such as virtual DCU/ECU service 104, may deploy a commonly formatted vehicle code package/virtual DCU package/virtual ECU package to virtual DCU/ECU orchestration environments included in different types of vehicles manufactured by the same or different manufacturers. Also, virtual DCU/ECU orchestration environments located in different placement locations (e.g. remote, network edge, etc.) may also follow the standardized paradigm such that vehicle code packages/virtual DCU packages/virtual ECU packages may be offloaded from various types of vehicles made by the same or different manufacturers to common remote virtual DCU/ECU execution environments. For example virtual DCU/ECU service 104 may deploy a common vehicle code package/virtual DCU package/virtual ECU package 608 to each of multiple different types of vehicles such as car 602, truck 604, and van 606 that may be manufactured by different vehicle manufacturers and may include electrical sensors manufactured by different parts manufacturers. Also any one of the different types of vehicles, such as car 602, truck 604, and van 606, may offload tasks and/or vehicle code packages to virtual ECUs in remote virtual DCU/ECU orchestration environment 114 or edge virtual DCU/ECU orchestration environment 146.

Also, as shown in FIG. 6, in some embodiments, a virtual DCU/ECU service 104 may further include a data store 610 for storing customer account information, a data store 612 for storing a directory of virtual DCUs/ECUs and to which customer account the virtual DCUs/ECUs belong. Additionally, virtual DCU/ECU service 104 may include a data store 614 for storing a directory of vehicles with virtual DCU/ECU orchestration environments associated with the virtual DCU/ECU service 104 and/or information indicating to which of the customer accounts the vehicles belong. Additionally, virtual DCU/ECU service 104 may include a data store 616 for storing customer virtual ECU data and/or a directory to storage locations for customer virtual DCU/ECU data stored in other locations, such as in a data storage service of service provider network 102.

In some embodiments, data stores 610, 612, 614, and 616 may enable clients of a virtual DCU/ECU service to associate vehicle data with a customer account and to further enable the vehicle data associated with the customer account to be used by virtual DCUs/ECUs associated with the customer account when executing vehicle code packages. Additionally, the data stores 610, 612, 614, and 616 may enable vehicle data/vehicle DCU/ECU execution data to be persistently stored. For example, a client that is a consumer of a vehicle with a customer account may have data associated with the consumer's customer account. The consumer may also instruct the virtual DCU/ECU service 104 to make the consumer's data associated with the consumer's customer account available to all virtual DCUs/ECUs that execute jobs/vehicle code packages for vehicles owned or operated by the vehicle consumer client. Also, the vehicle data associated with the vehicle consumer customer account may persist even after the consumer no longer owns a current vehicle from which the data was collected. This may allow customer preferences and learnings generated from client virtual DCU/ECU execution data and/or vehicle data to be applied to improve functioning of subsequent vehicles purchased by the vehicle consumer and associated with the vehicle consumer's customer account.

Figure 7A:
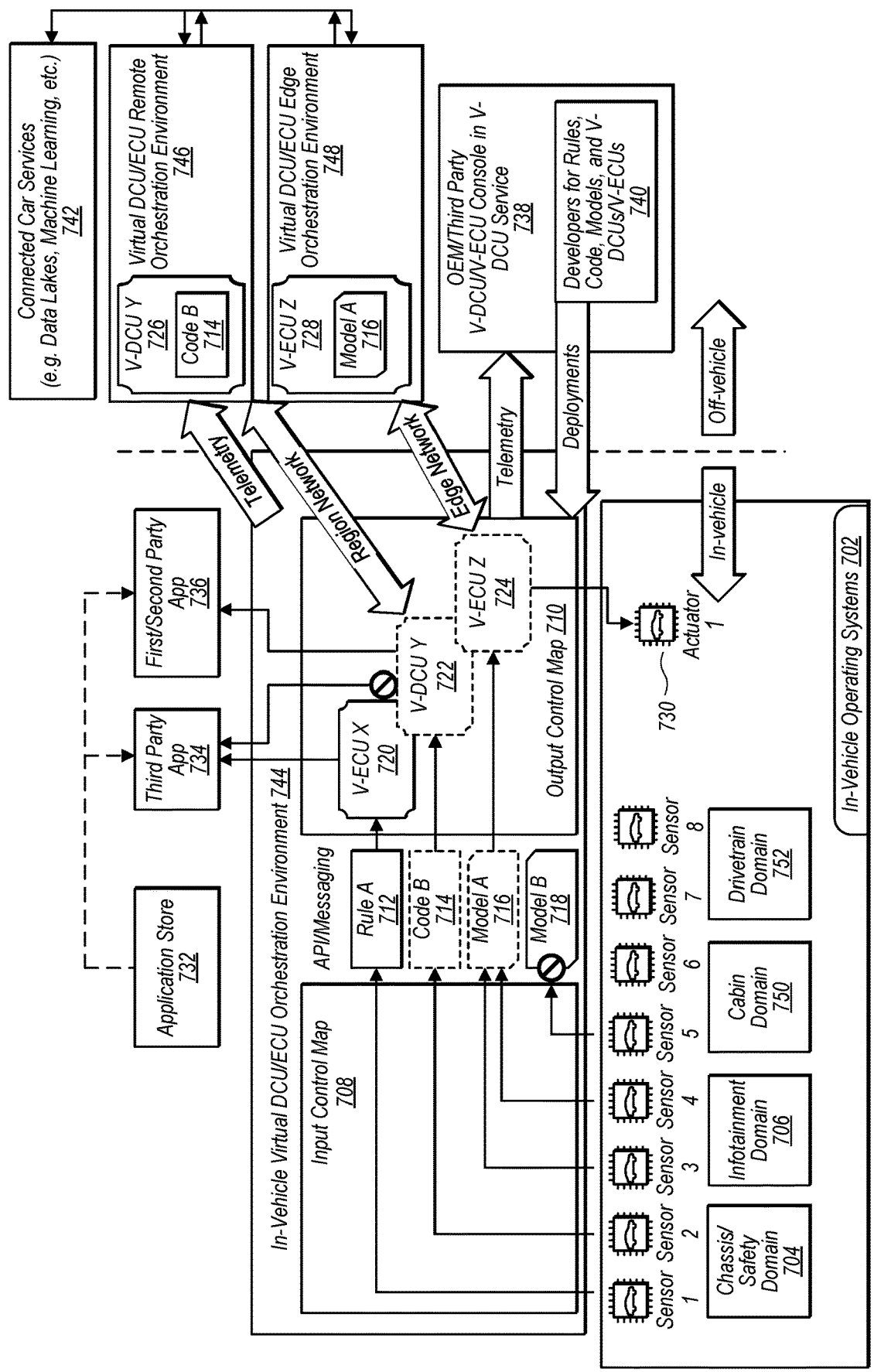
FIG. 7A illustrates an example view of local and remote virtual DCU/ECU execution environments, wherein virtual DCUs/ECUs in a local virtual DCU/ECU execution environment function as input/output conduits for virtual DCUs/ECUs in remote virtual DCU/ECU execution environments, according to some embodiments.

FIG. 7A illustrates an example view of local and remote virtual DCU/ECU execution environments, wherein virtual DCU/ECUs in a local virtual DCU/ECU execution environment function as input/output conduits for virtual DCU/ECUs in remote virtual DCU/ECU execution environments, according to some embodiments.

As discussed above, a virtual DCU/ECU service, such as virtual DCU/ECU service 104, may include a service interface 108 that implements a console, such as OEM/third party V-DCU/V-ECU control console 738, which may enable developers of rules, algorithms, models, and vehicle code packages (740) to deploy such rules, algorithms, models and/or vehicle code packages into an in-vehicle virtual DCU/ECU orchestration environment 744. Additionally, vehicle usage data such as telemetry may be provided back to the developers of rules algorithms, models, and vehicle code packages (740) and/or connected car services 742. For example, in some embodiments an application provided by developers of rules algorithms, models, and vehicle code packages (740) may be purchased from application store 732, which may cause third party application 734 or first/second party application 736 to be deployed in the vehicle. Additionally, the purchase from the application store may cause one or more vehicle code packages/virtual ECU packages to be deployed to in-vehicle virtual DCU/ECU orchestration environment 744, edge virtual DCU/ECU orchestration environment 748, or remote virtual DCU/ECU orchestration environment 746, wherein the third-party application 734 or the first/second party application 736 takes an output of the code executed at the virtual DCU/ECU(s) as an input to the respective applications. For example, virtual ECU X (720), code B 714 executing at V-DCU Y in remote virtual DCU/ECU orchestration environment 746 that passes inputs and outputs through virtual DCU Y (722) and virtual ECU Z 726 executing model A 716 in edge virtual DCU/ECU orchestration environment 748 that passes inputs and outputs through virtual ECU Z (724) may pass output data to third party app 734 or first/second party app 736. Additionally, in some embodiments, rule A (712), code B (714), model A (716), and model B (718) may be deployed to a virtual DCU/ECU in the in-vehicle virtual ECU orchestration environment 744, a virtual DCU/ECU in the remote virtual DCU/ECU orchestration environment 746 or a virtual DCU/ECU in the edge virtual DCU/ECU orchestration environment 748.

In some embodiments, a vehicle code package may include code, such as rule A 712 for virtual ECU X (720), code B 714 for virtual DCU Y (722) and model A 716 for virtual ECU Z (724) along with mappings for input sensor control map 708 and output sensor control map 710. As shown in FIG. 7A virtual DCU Y is implemented in the remote virtual DCU/ECU orchestration environment 746, where V-EDU Y 726 executes code B 714. Code B 714 is also shown in dotted lines in the API/message portions of the in-vehicle virtual DCU/ECU orchestration environment to indicate that input data is relayed to the code B 714 executing in the remote virtual DCU/ECU orchestration environment based on a configuration of the input control map 708 that controls access to data from the sensors in the different ones of the domains of the vehicle, such as chassis/safety domain 704, infotainment domain 706, cabin domain 750, and drivetrain domain 752. Also, V-DCU Y 722 is illustrated in dotted lines to indicate a placeholder that controls the output of the code B 714 executing in the remote virtual DCU/ECU orchestration environment 746 via virtual DCU Y 726, such that the output data is controlled according to the output control map 718. In some embodiments, the mappings included in a vehicle code package/virtual DCU package/virtual ECU package may include mapping rules that instruct input control map 708 and output control map 710 how to control data flow into and out of a virtual DCU/ECU executing code included in the vehicle code package/virtual DCU package/virtual ECU package. For example, the mappings included in a vehicle code package with code B 714 may instruct to disallow output data from the execution of code B 714 to be provided to third party apps 734, but to allow the output data from the execution of code B 714 to be provided to first/second party apps 736. Likewise, mappings included with a vehicle code package comprising rule A 712 may instruct code executing on virtual ECU X 720 to allow output data to be provided to third party app 734. As another example, a mapping included in a vehicle code package comprising model A 716 may instruct to provide output data from model A 716 (being executed remotely at V-ECU Z 728) to actuator 730.

As another example, an input control map may disallow input data from sensor 5 to be provided as an input to model 718. In some embodiments, model B 718 may be implemented on a physical ECU, as opposed to a virtual ECU. While, not shown in FIG. 7A, an output of model B 718 may be mapped as an input to rule A 712, code B 714 (executing remotely), model A 716 (executing remotely), etc.

In some embodiments, third-party applications may not have authority to cause vehicle code packages to be deployed, but may instead request that a first or second party, such as a vehicle OEM, authorize deployment of a vehicle code package needed for implementation of a third-party application. In some embodiments, an application when implemented in a vehicle may request access to inputs needed by the application using an input discovery module, such as input discovery module 904, which is further described in FIG. 9. In such embodiments, the input discovery module may request additional virtual ECUs needed for an application from an OEM, if the virtual ECUs are not already implemented in the virtual DCU/ECU orchestration environment of the vehicle or a remote virtual DCU/ECU orchestration environment accessible from the vehicle. In some embodiments, an OEM may select a particular type of virtual DCU/ECU to implement in response to a request, which may differ from a particular type of virtual DCU/ECU requested. For example, based on a vehicle package, or OEM preferences the OEM may select a different virtual DCU/ECU to provide for use by the third-party application.

In some embodiments, an OEM client of a virtual DCU/ECU service may control access to data from code executing at virtual DCUs/ECUs. This may apply to virtual DCUs/ECUs already deployed and/or to new virtual ECUs that are being requested to be deployed.

In some embodiments, input sensor control map 708 may map sensor data from sensors 1 and 2 in chassis/safety system domain 704 to rule A (712) and code B (714). The input sensor control map 708 may also map sensor data from sensor 3 in the infotainment domain to model A (716). These are provided as example mappings. In some embodiments any one of the virtual ECUs may be mapped to input data from any of the vehicle domains and/or may provide output data to actuators in any of the vehicle domains.

Figure 7B:
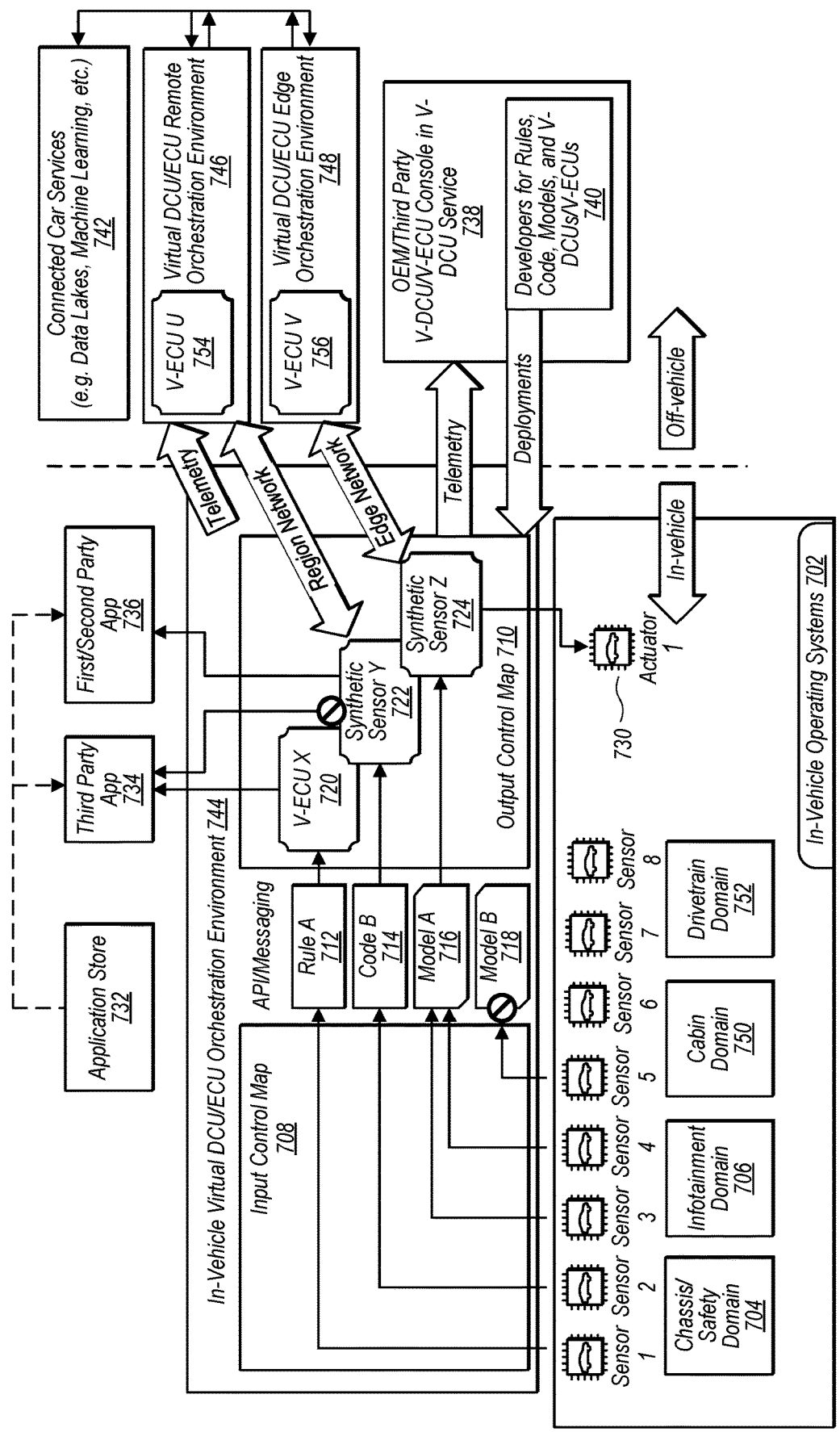
FIG. 7B illustrates an example view of local and remote virtual DCU/ECU execution environments, wherein an application executing on the vehicle unloads one or more tasks to remote virtual DCUs/ECUs implemented in remote virtual DCU/ECU execution environments, according to some embodiments.

FIG. 7B illustrates an example view of local and remote virtual DCU/ECU execution environments, wherein an application executing on the vehicle unloads one or more tasks to remote virtual DCUs/ECUs implemented in remote virtual DCU/ECU execution environments, according to some embodiments.

The in-vehicle operating system illustrated in FIG. 7B is similar to that of FIG. 7A. Except for in FIG. 7B, synthetic sensor Y 722 and synthetic sensor Z 724 execute code B 714 and model A 716 locally in the in-vehicle virtual DCU/ECU orchestration environment 744 and delegate sub-tasks associated with the code B 714 and model A 716 to virtual ECU U (754) and virtual ECU V (756) implemented remotely. For example, whereas a shell of a virtual DCU functioned as an IO pass through in FIG. 7A, in some embodiments, a synthetic sensor or locally implemented virtual DCU/ECU may execute code locally and coordinate with a remote virtual ECU to perform tasks. In some embodiments, a remote virtual ECU may be associated with a local software agent implemented in the local virtual DCU/ECU orchestration environment. Also, in some embodiments, a remote virtual ECU may be implemented with a standardized interface for receiving and/or sending input and/or output data, such that the virtual ECU may be unaffected by how in-vehicle software is implemented. As long as input and output data is formatted in accordance with the standardized interface the remote virtual ECU may process the input data and provide the output data regardless of details as to how other components are implemented in a local orchestration environment of the vehicle.

Figure 8:
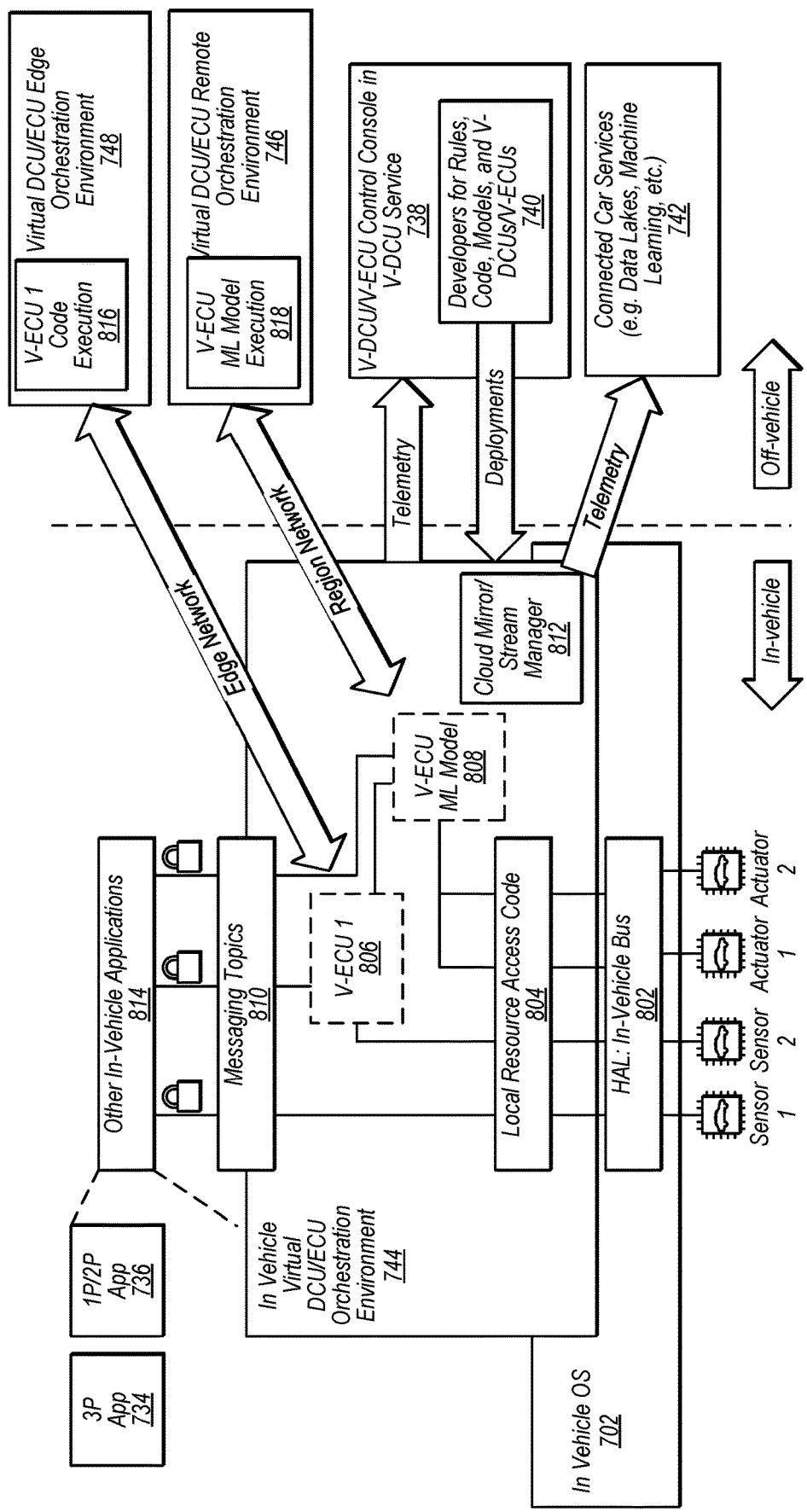
FIG. 8 illustrates an example view of remote virtual DCU/ECU execution environments and an example implementation for a local virtual DCU/ECU execution environment, wherein the local virtual DCU/ECU execution environment is implemented using an in-vehicle operating system, according to some embodiments.

FIG. 8 illustrates an example view of remote virtual DCU/ECU execution environments and an example implementation for a local virtual DCU/ECU execution environment, wherein the local virtual DCU/ECU execution environment is implemented using an in-vehicle operating system, according to some embodiments.

As shown in FIG. 8, in some embodiments an in-vehicle virtual DCU/ECU orchestration environment 744 may be implemented on top of an in-vehicle operating system 702 that includes a hardware abstraction layer (HAL), in-vehicle bus 802, or both. The HAL or in-vehicle bus 802 may interface with a local resource access code component 804 of in vehicle virtual DCU/ECU orchestration environment 744 and the local resource access code component 804 may allow or disallow sensor data from sensors 1 or 2 or actuators 3 or 4 to flow to or from the HAL or in-vehicle bus 802 to or from respective components of a virtual DCU/ECU orchestration environment, such as V-ECU 1 code 806 (which is executed remotely at VECU-1 (code execution 816) which is implemented in edge virtual DCU/ECU orchestration environment 748) and virtual ECU machine learning model 808 (which is executed remotely at VECU-ML (model execution 818) which is implemented in remote virtual DCU/ECU orchestration environment 746). Additionally, messaging topics 810 may allow or disallow data to flow out of virtual DCU/ECU orchestration environment 744 to other in-vehicle applications 814, such as third party applications 734, first/second party applications 736, etc. In some embodiments, an in-vehicle virtual DCU/ECU orchestration environment 744 may further include a cloud mirror/stream manager component 812 that mirrors or sends sensor data, such as telemetry, to connected car services 742, virtual DCU/ECU remote execution environment 746 or virtual DCU/ECU edge orchestration environment 748. Likewise, as shown in FIGS. 7A and 7B vehicle data and/or virtual DCU/ECU execution data may be shared between virtual DCU/ECU execution environments. For example, between in-vehicle virtual DCU/ECU orchestration environment 744, virtual DCU/ECU remote orchestration environment 746, and virtual DCU/ECU edge orchestration environment 748.

In some embodiments, sensor data and/or virtual DCU/ECU execution data may be provided to a storage service, such as data storage service 516 (illustrated in FIG. 5), the sensor data and/or virtual DCU/ECU execution data may then be used by a machine learning service, such as machine learning service 518 (illustrated in FIG. 5). The machine learning service may determine relationships that may further be used to create new logic elements that may be added to code logic depository 106. The new logic elements may then be selected for use in new virtual DCU/ECU packages. Also, machine learning service may determine relationships may determine vehicle consumer preferences based on the sensor data and/or virtual DCU/ECU execution data and may store the vehicle consumer preferences to be used as inputs to virtual DCUs/ECUs that execute code related to the vehicle consumer.

Figure 9:
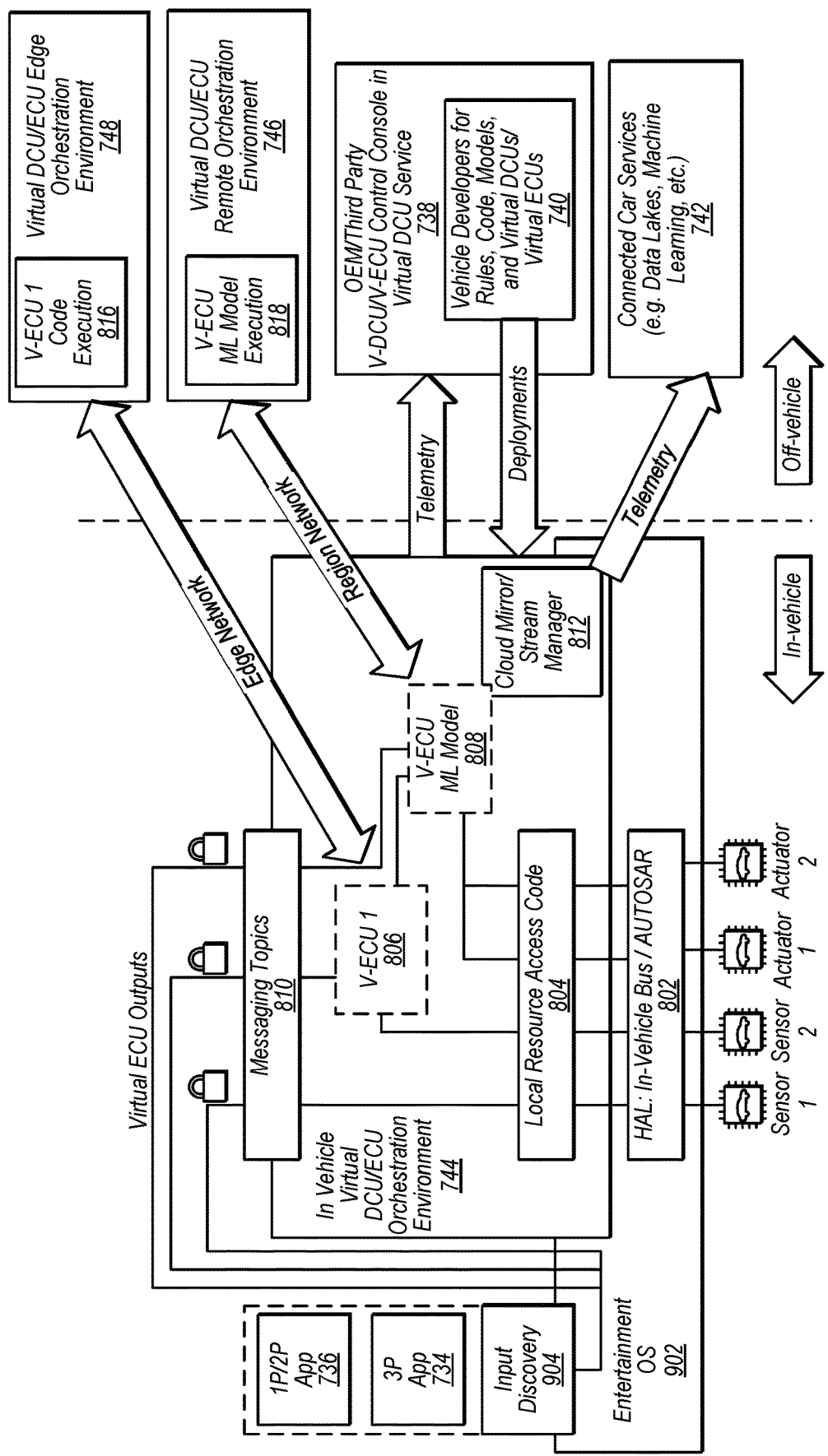
FIG. 9 illustrates an example view of remote virtual DCU/ECU execution environments and an example implementation for a local virtual DCU/ECU execution environment, wherein the local virtual DCU/ECU execution environment is implemented using an entertainment operating system of a vehicle, according to some embodiments.

FIG. 9 illustrates an example view of remote virtual DCU/ECU execution environments and an example implementation for a local virtual ECU execution environment, wherein the local virtual ECU execution environment is implemented using an entertainment operating system of a vehicle, according to some embodiments.

The in-vehicle virtual ECU orchestration environment 744 illustrated in FIG. 9 may be similar to the in-vehicle virtual ECU orchestration environment 744 illustrated in FIG. 8, except in FIG. 9 the in-vehicle virtual ECU orchestration environment 744 is implemented on top of an entertainment system operating system 902 and uses an input discovery component 904 to communicate sensor data/virtual ECU execution data to third party applications 734 and/or first/second party applications 736 that are implemented in another domain other than the entertainment operating system domain 902.

Figure 10:
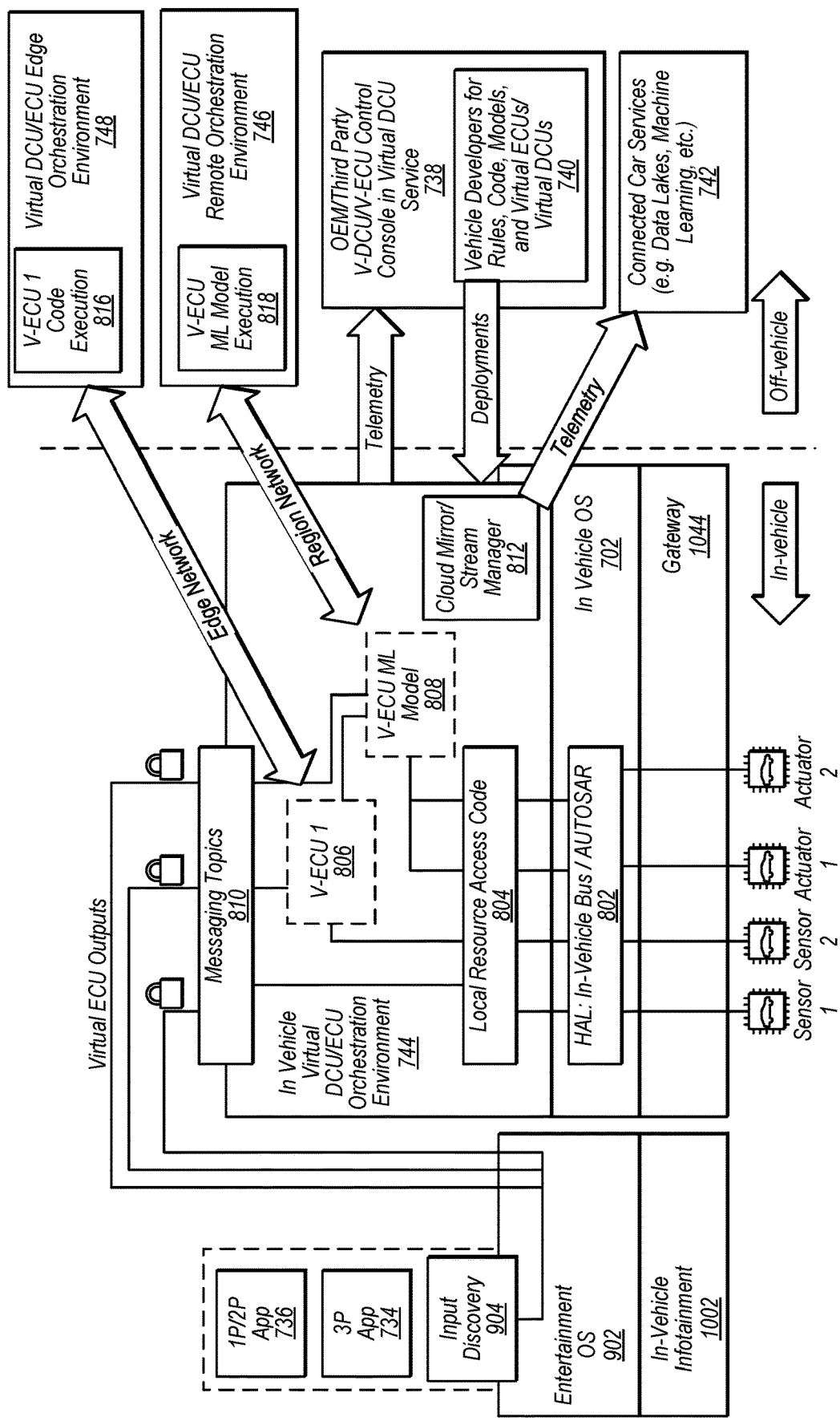
FIG. 10 illustrates an example view of remote virtual DCU/ECU execution environments and an example implementation for a local virtual DCU/ECU execution environment, wherein the local virtual DCU/ECU execution environment is implemented in a gateway between an in-vehicle operating system and an entertainment operating system of a vehicle, according to some embodiments.

FIG. 10 illustrates an example view of remote virtual DCU/ECU execution environments and an example implementation for a local virtual ECU execution environment, wherein the local virtual ECU execution environment is implemented in a gateway between an in-vehicle operating system and an entertainment operating system of a vehicle, according to some embodiments.

The in-vehicle virtual ECU orchestration environment 744 illustrated in FIG. 10 may be similar to the in-vehicle virtual ECU orchestration environment 744 illustrated in FIG. 8 or 9, except in FIG. 10 the in-vehicle virtual ECU orchestration environment 744 is implemented on top of in-vehicle operating system 702 implemented in a gateway 1044 and uses an input discovery component 904 to communicate sensor data and/or virtual ECU execution data to third party applications 734 and/or first/second party applications 736 that are implemented in an entertainment operating system 902 implemented on an in-vehicle infotainment computing device 1002. In some embodiments, gateway 1044 and in-vehicle infotainment 1002 may be separate computing devices that respectively implement the in-vehicle operating system 702 and the entertainment system operating system 902.

FIG. 11 illustrates a flowchart for example operations performed by a virtual DCU/ECU orchestration environment of a vehicle, according to some embodiments.

At 1102, a local computing device mounted in a vehicle implements a virtual domain control unit (DCU) and/or electronic control unit (ECU) orchestration environment configured to receive vehicle code packages/virtual DCU packages/virtual ECU packages, etc. via a network connection to the vehicle and configured to implement virtual DCUs and/or virtual ECUs during production of a vehicle or subsequent to the vehicle being put into use by an owner or operator of the vehicle. The local virtual DCU/ECU orchestration environment is also configured to coordinate with remotely located virtual DCU/ECU orchestration environments to execute vehicle code packages/virtual DCU packages/virtual ECU packages.

At 1104, the local computing device mounted in the vehicle establishes communication channels between existing components of the vehicle and the virtual DCU/ECU orchestration environment via an in-vehicle bus of the vehicles. For example, the communication channels may be established by accessing a HAL bus as described in FIGS. 8-10 and/or by applying local resource access codes. Furthermore, an input control map may control information flow to particular virtual DCUs/ECUs either implemented locally or remotely.

At 1106, the local computing device mounted in the vehicle receives, at the vehicle via a connection to a virtual DCU/ECU service, one or more vehicle code packages/virtual DCU packages/virtual ECU packages, wherein the vehicle code packages/virtual DCU packages/virtual ECU packages comprise code logic and mappings in an enveloped format and one or more annotations for the vehicle code package/virtual DCU package/virtual ECU package outside of the envelope.

At 1108, the local computing device mounted in the vehicle determines, based on the one or more annotations for a given vehicle code package/virtual DCU package/virtual ECU package, a particular placement location for the vehicle code package/virtual DCU package/virtual ECU package, wherein the placement location is selected from a group of possible placement locations including a local placement in the virtual DCU/ECU orchestration environment implemented at the vehicle and one or more remote virtual DCU/ECU orchestration environments. Note that in some embodiments, placement at remote virtual DCU/ECU orchestration environments may be determined by a virtual DCU/ECU service and the vehicle code package/virtual DCU package/virtual ECU package may be sent directly to a selected remote placement location instead first being sent to the vehicle.

At 1110, the local computing device mounted in the vehicle determines a communication mapping for each of the vehicle code packages/virtual DCUs/virtual ECUs within a respective operating system or operating system domain in which the vehicle code package/virtual DCU package/virtual ECU package is placed, based on the mapping included in the vehicle code package/virtual DCU package/virtual ECU package. For example, an input control map 708 as illustrated in FIGS. 7A and 7B.

At 1112, the local computing device mounted in the vehicle performs one or more configuration operations in accordance with the determined communication mappings to enable respective ones of the given vehicle code packages/virtual DCUs/virtual ECUs to have access to input data from one or more existing physical vehicle components available in the particular operating system or operating system domain or to have access to input data from another vehicle code package/virtual ECU. The local computing device mounted in the vehicle also performs one or more configuration operations to enable output data from the respective ones of the given vehicle code packages/virtual DCUs/virtual ECUs to flow to output destinations in the vehicle. For example, by generating an output control map 710 as shown in FIGS. 7A and 7B.

At 1114, the local computing device mounted in the vehicle optionally publishes or advertises the new one or more virtual DCUs or virtual ECUs to other DCUs, ECUs, virtual DCUs, virtual ECUs, components of the vehicle, etc. and/or to other applications configured to interact with the virtual DCU/ECU orchestration environment.

Figure 12:
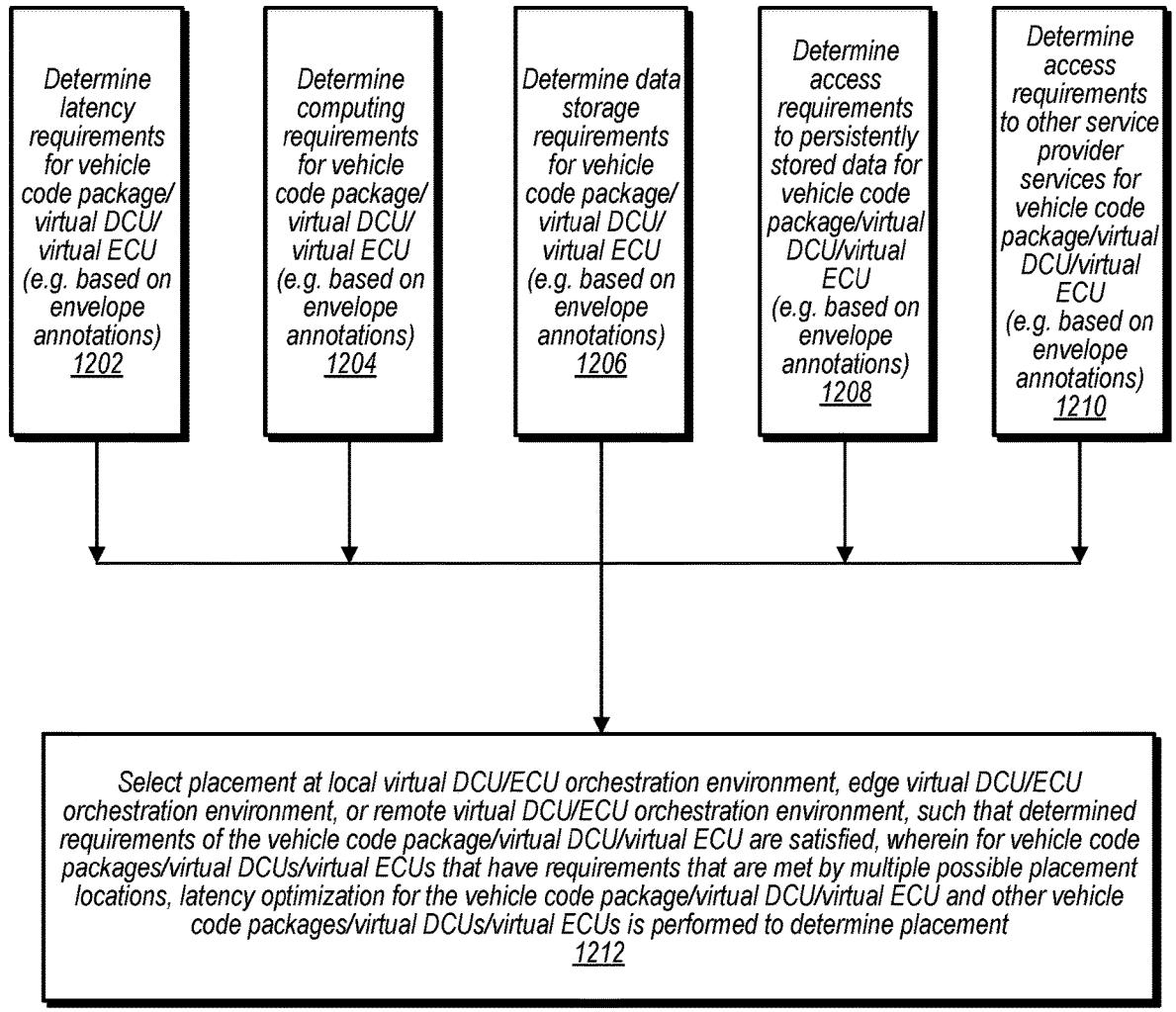
FIG. 12 is a flowchart illustrating additional details regarding how a virtual DCU/ECU orchestration environment of a vehicle may determine placement for a vehicle code package/virtual DCU package/virtual ECU package, according to some embodiments.

FIG. 12 is a flowchart illustrating additional details regarding how a virtual DCU/ECU orchestration environment of a vehicle may determine placement for a vehicle code package/virtual DCU package/virtual ECU package, according to some embodiments.

In some embodiments, in order to determine a placement for a vehicle code package/virtual DCU package/virtual ECU package, a placement module may determine various factors to be used in the placement decision. For example, at 1202 a placement module determines latency requirements for vehicle code package/virtual DCU package/virtual ECU package (e.g. based on envelope annotations).

At 1204, the placement module determines computing requirements for vehicle code package/virtual DCU/virtual ECU (e.g. based on envelope annotations).

At 1206, the placement module determines data storage requirements for vehicle code package/virtual DCU/virtual ECU (e.g. based on envelope annotations).

At 1208, the placement module determines access requirements to persistently stored data for vehicle code package/virtual DCU/virtual ECU (e.g. based on envelope annotations).

At 1210, the placement module determines access requirements to other service provider services for vehicle code package/virtual DCU/virtual ECU (e.g. based on envelope annotations).

In some embodiments, a placement module may determine more or fewer factors for use in making a placement decision than the factors shown in 1202 through 1210.

A 1212, the placement module uses the determined placement factors to select a placement location for the vehicle code package/virtual DCU package/virtual ECU package at a local virtual DCU/ECU orchestration environment, an edge virtual DCU/ECU orchestration environment, or a remote virtual orchestration environment, such that determined requirements of the vehicle code package/virtual DCU/virtual ECU are satisfied. For vehicle code packages/virtual DCUs/ECUs that have requirements that are met by multiple possible placement locations, latency optimization for the vehicle code package/virtual DCU/ECU and other vehicle code packages/virtual DCUs/ECUs may be performed to determine a placement location for the vehicle code package/virtual DCU/virtual ECU.

Figure 13:
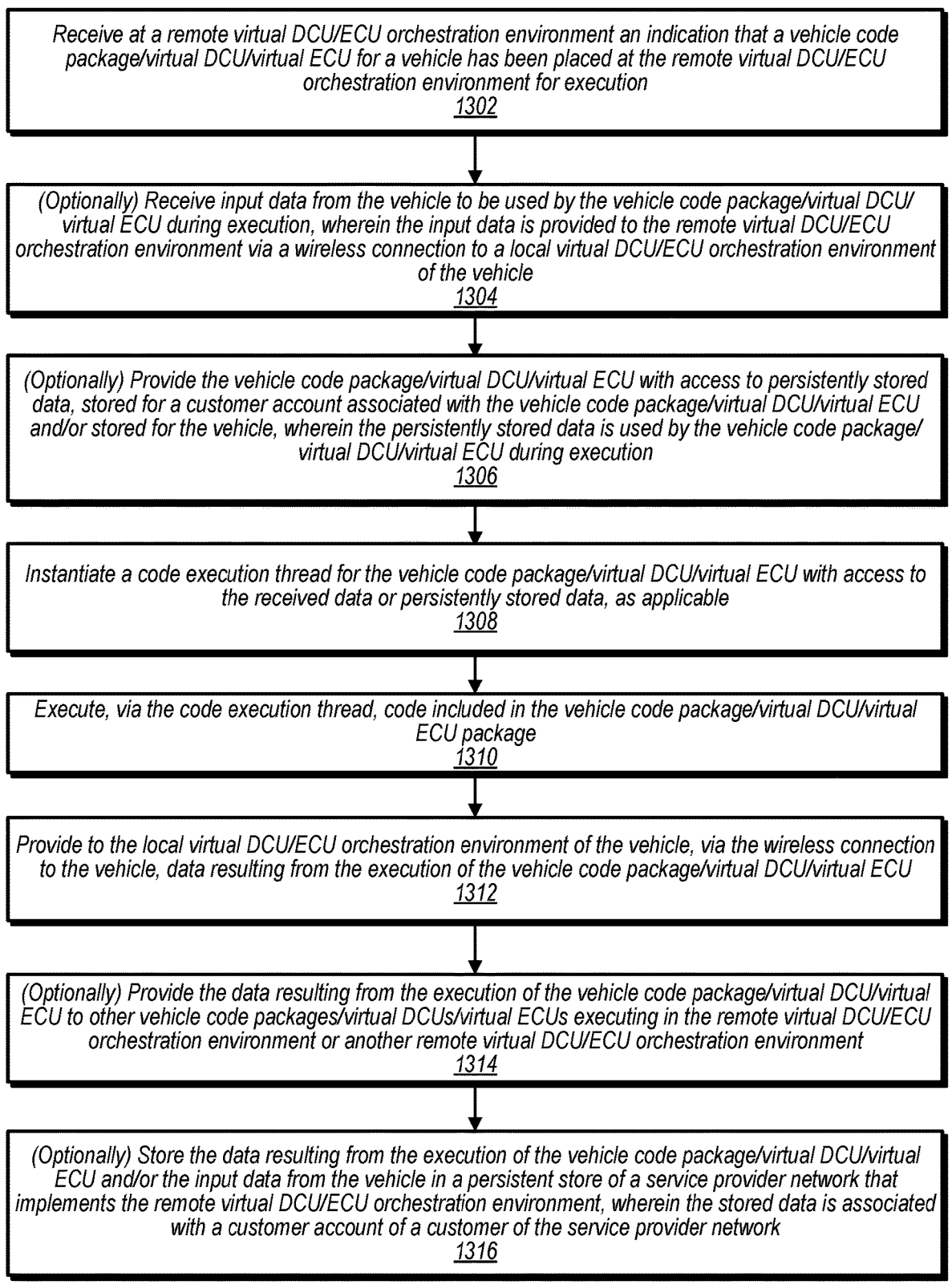
FIG. 13 illustrates a flowchart for example operations performed by a remote virtual DCU/ECU orchestration environment that implements a virtual DCU/virtual ECU placed in the remote virtual DCU/ECU orchestration environment, according to some embodiments.

FIG. 13 illustrates a flowchart for example operations performed by a remote virtual DCU/ECU orchestration environment that implements a virtual DCU/ECU placed in the remote virtual DCU/ECU orchestration environment, according to some embodiments.

At 1302, a remote virtual DCU/ECU orchestration environment receives an indication that a vehicle code package/virtual DCU/ECU for a vehicle has been placed at the remote virtual DCU/ECU orchestration environment for execution.

At 1304, the remote virtual DCU/ECU orchestration environment optionally receives input data from the vehicle to be used by the vehicle code package/virtual DCU/ECU during execution, wherein the input data is provided to the remote virtual DCU/ECU orchestration environment via a wireless connection to a local virtual DCU/ECU orchestration environment of the vehicle. Note that in some embodiments, a remotely implemented virtual DCU/ECU may receive input data from other sources, such as persistently stored data for the vehicle, etc.

At 1306, the remote virtual DCU/ECU orchestration environment is optionally provided access to persistently stored data, stored for a customer account associated with the vehicle code package/virtual DCU/virtual ECU and/or stored for the vehicle, wherein the persistently stored data is used by the vehicle code package/virtual DCU/ECU during execution.

At 1308, the remote virtual DCU/ECU orchestration environment instantiates a code execution thread for the vehicle code package/virtual DCU/ECU with access to the received data or persistently stored data, as applicable, and, at 1310, executes, via the code execution thread, code included in the vehicle code package/virtual DCU/ECU package.

At 1312, the remote virtual DCU/ECU orchestration environment provides data resulting from the execution of the vehicle code package/virtual ECU to the local virtual DCU/ECU orchestration environment of the vehicle, via the wireless connection to the vehicle.

At 1314, the remote virtual DCU/ECU orchestration environment optionally provides the data resulting from the execution of the vehicle code package/virtual DCU/virtual ECU to other vehicle code packages/virtual DCUs/ECUs executing in the remote virtual DCU/ECU orchestration environment or another remote virtual DCU/ECU orchestration environment.

At 1316, the remote virtual DCU/ECU orchestration environment optionally stores the data resulting from the execution of the vehicle code package/virtual DCU/ECU and/or the input data from the vehicle in a persistent store of a service provider network that implements the remote virtual DCU/ECU orchestration environment, wherein the stored data is associated with a customer account of a customer of the service provider network.

Figure 14:
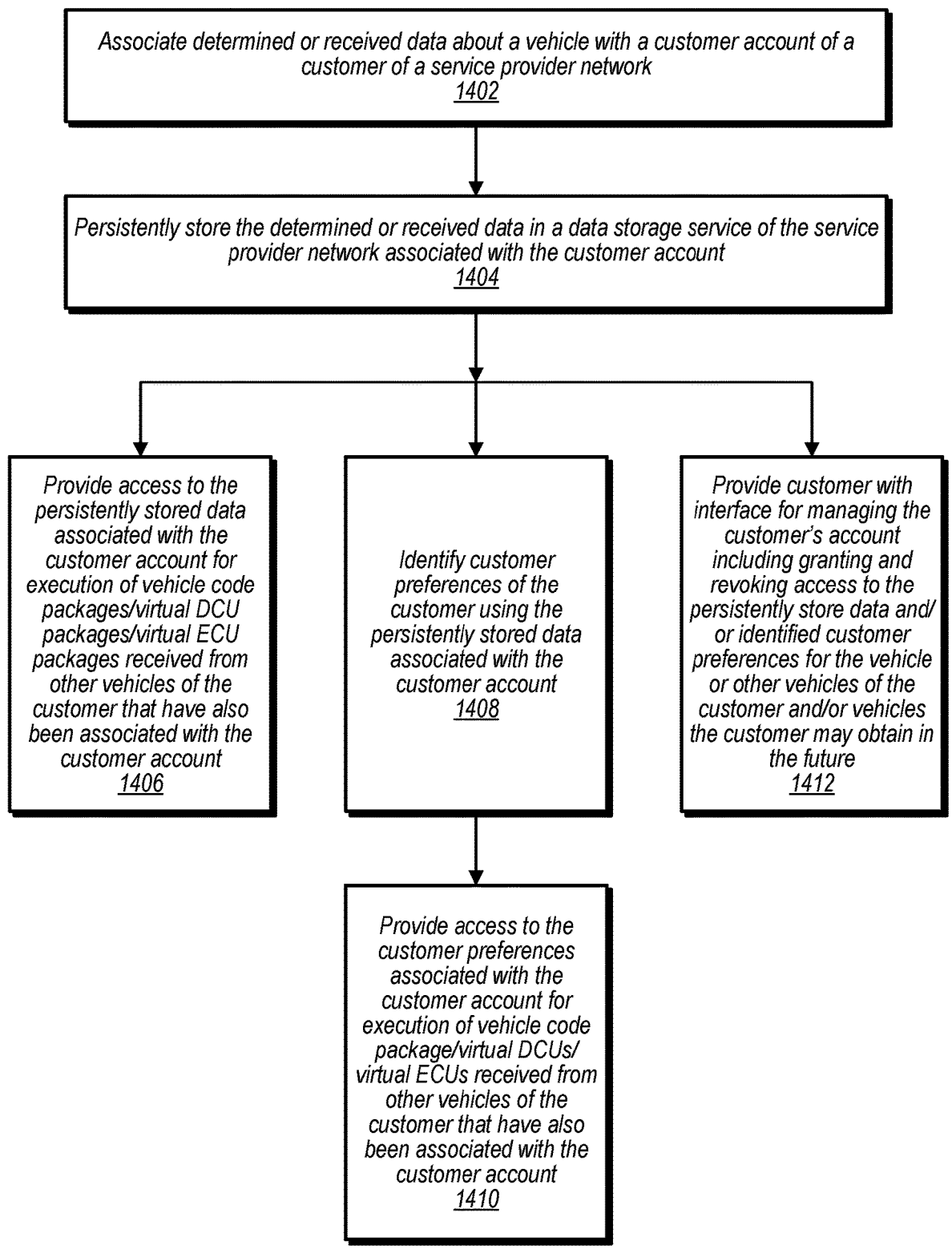
FIG. 14 illustrates flowchart for processing vehicle data and/or virtual DCU/ECU data by a remote virtual DCU/ECU orchestration environment, according to some embodiments.

FIG. 14 illustrates flowchart for processing vehicle data and/or virtual DCU/ECU data by a remote virtual DCU/ECU orchestration environment, according to some embodiments.

At 1402, a virtual DCU/ECU service and/or a remote virtual DCU/ECU orchestration environment associates determined or received data about a vehicle with a customer account of a customer of a service provider network and/or the virtual DCU/ECU service.

At 1404, the virtual DCU/ECU service and/or the remote virtual DCU/ECU orchestration environment causes the determined or received data to be persistently stored in a data storage service of the service provider network associated with the customer account.

In some embodiments, at 1406 the service provider network and/or virtual DCU/ECU service provides access to the persistently stored data associated with the customer account for execution of vehicle code packages/virtual DCU/ECUs received from other vehicles of the customer that have also been associated with the customer account.

In some embodiments, at 1408, the service provider network and/or virtual DCU/ECU service identifies, or with the help of another service, such as a machine learning service, identifies, customer preferences of the customer using the persistently stored data associated with the customer account. At 1410, in such embodiments, the service provider network and/or virtual DCU/ECU service then provides access to the customer preferences associated with the customer account for execution of vehicle code package/virtual DCUs/ECUs received from other vehicles of the customer that have also been associated with the customer account.

In some embodiments, at 1412, the virtual DCU/ECU service provides a customer or client of the virtual DCU/ECU service with an interface for managing the customer's account including granting and revoking access to the persistently store data and/or identified customer preferences for the vehicle or other vehicles of the customer and/or vehicles the customer may obtain in the future.

Figure 15:
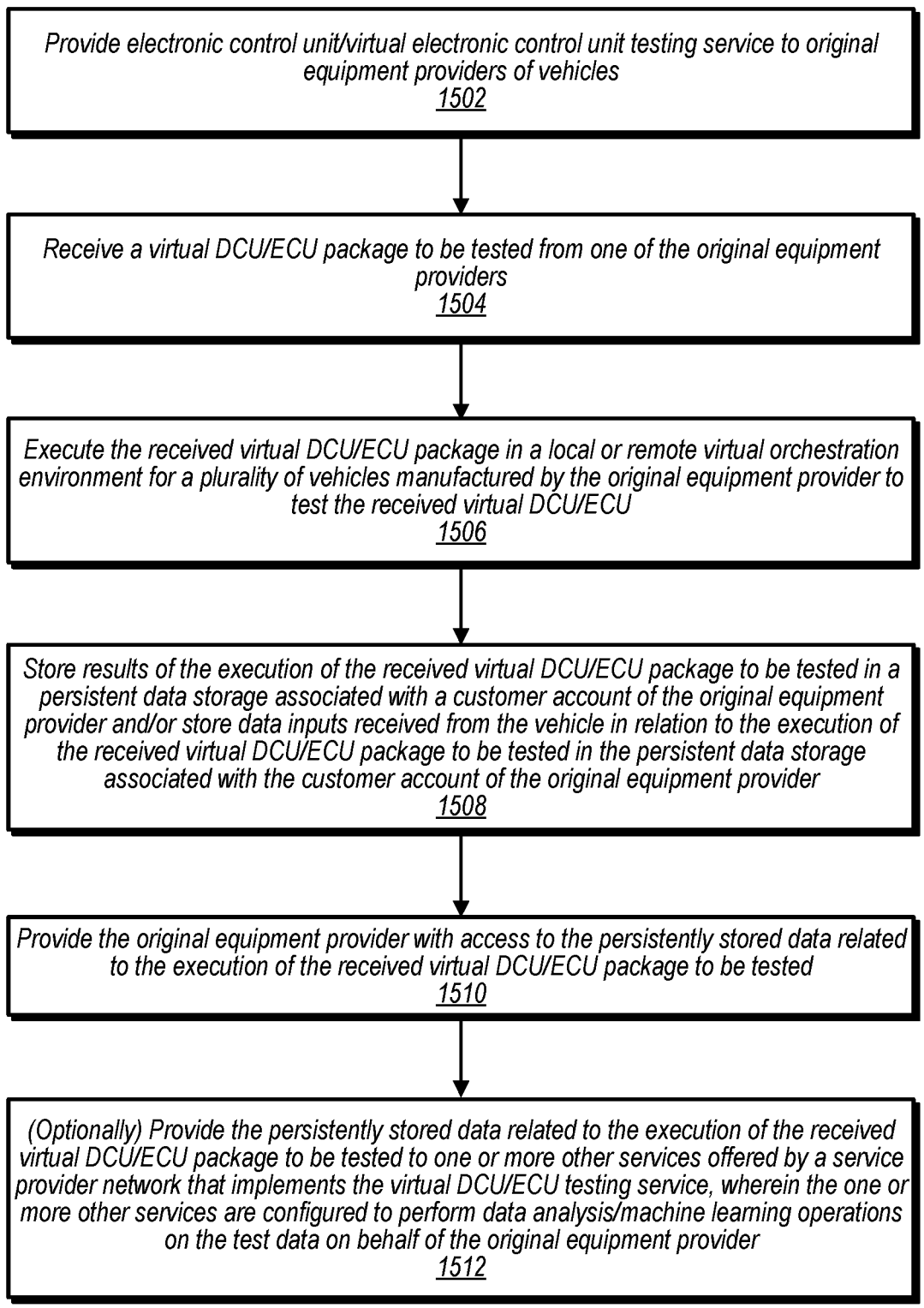
FIG. 15 illustrates a flowchart for providing a DCU/ECU/virtual DCU/ECU testing service to clients of a service provider network, according to some embodiments.

FIG. 15 illustrates a flowchart for providing a DCU/virtual DCU and/or ECU/virtual ECU testing service to clients of a service provider network, according to some embodiments.

At 1502, a virtual DCU/ECU service provides an electronic control unit/virtual electronic control unit testing service to original equipment providers of vehicles, such as vehicle OEMs and/or parts OEMs.

At 1504, the testing service receives a virtual DCU package or a virtual ECU package to be tested from one of the original equipment providers. In some situations, the virtual DCU/ECU package may represent code logic and mapping that are to be used in a physical DCU/ECU to be manufactured by the original equipment provider if the testing of the virtual DCU/ECU is successful. Also, the virtual DCU/ECU package may represent a Beta version of a new feature the original equipment provider may release via a vehicle code package, as another example.

At 1506, the testing service executes the received virtual DCU/ECU package in a local or remote virtual orchestration environment for a plurality of vehicles manufactured by the original equipment provider to test the received virtual DCU/ECU.

At 1508, the testing service causes results to be stored for the execution of the received virtual DCU/ECU package to be tested. The results may be stored in a persistent data storage associated with a customer account of the original equipment provider. Also, data inputs received from the vehicle in relation to the execution of the received virtual DCU/ECU package to be tested may be caused to be stored in the persistent data storage associated with the customer account of the original equipment provider.

At 1510, the testing service provides the original equipment provider with access to the persistently stored data related to the execution of the received virtual DCU/ECU package to be tested. And, at 1512, the testing service optionally provides the persistently stored data related to the execution of the received virtual DCU/ECU package to be tested to one or more other services offered by a service provider network that implements the virtual DCU/ECU testing service, wherein the one or more other services are configured to perform data analysis/machine learning operations on the test data on behalf of the original equipment provider.

FIG. 16 illustrates a process for re-shuffling vehicle code package/virtual DCU package/virtual ECU package placements amongst two or more virtual DCU/ECU orchestration environments at local or remote locations in response to changes at the vehicle or in the remote virtual DCU/ECU orchestration environments, according to some embodiments.

At 1602, a virtual DCU/ECU service and/or a virtual DCU/ECU orchestration environment detects whether an additional physical or virtual ECU has been added to the vehicle and/or added to a remote virtual DCU/ECU orchestration environment in communication with the vehicle.

At 1604, the virtual DCU/ECU service and/or a virtual DCU/ECU orchestration environment detects whether communications from an existing virtual DCU/ECU have been lost or latencies associated with the existing virtual DCU/ECU have changed.

At 1606, the virtual DCU/ECU service and/or a virtual DCU/ECU orchestration environment receives an advertisement or publication of additional virtual ECUs that have been implemented in one or more virtual DCU/ECU orchestration environments in communication with the vehicle.

At 1608, the virtual DCU/ECU service and/or a virtual DCU/ECU orchestration environment determines whether or not one or more changes in certification level have taken place for a synthetic sensor and/or virtual DCU/ECU implemented in one or more virtual DCU/ECU orchestration environments that are in communication with the vehicle or in relation to a physical sensor that shares sensor data with the virtual DCU/ECU orchestration environment.

At 1610, the virtual DCU/ECU service and/or a virtual DCU/ECU orchestration environment determines/detects a change in vehicle resource availability, such as changes in computing capacity in one or more domains of the vehicle. For example, a change resulting in extra computing capacity in a particular domain may justify re-locating a virtual ECU to the domain with extra computing capacity, or along with other considerations may justify such a change in placement.

At 1612, the virtual DCU/ECU service and/or a virtual DCU/ECU orchestration environment determines/detects a change in virtual DCU/ECU capacity for one or more virtual DCUs/ECUs in communication with the vehicle, such as remote virtual ECUs implemented in a wireless edge network location or a regional data center location. For example, in some embodiments a client of a virtual ECU service may upgrade an existing virtual ECU or virtual DCU, for example to have a greater computing allocation, memory allocation, data storage allocation, etc. For example, in some embodiments a vehicle OEM may manage a fleet of virtual DCUs or virtual ECUs and may negotiate a new contract, etc. that changes capacities of the virtual DCUs or virtual ECUs of the fleet allocated to the OEM. In some embodiments, an OEM may configure virtual DCUs or virtual ECUs to regularly or automatically change capacity. For example, an OEM with worldwide operations may cause virtual DCUs or virtual ECUs in parts of the world in which it is current day time to have greater capacity allocations than virtual DCUs/ECUs in the OEMs fleet for which it is currently nighttime. Thus, in such an arrangement virtual DCU/ECU capacities of the virtual DCUs/ECUs of the OEMs fleet may "follow the sun" and change on a daily basis.

At 1614, the virtual DCU/ECU service and/or a virtual DCU/ECU orchestration environment determines whether a number or importance of the changes taken place at 1602, 1604, 1606, 1608, 1610, or 1612 exceed one or more threshold to cause a re-shuffle operation to be performed. In a re-shuffle operation, the virtual DCU/ECU service and/or a virtual DCU/ECU orchestration environment may re-evaluate placements of already implemented vehicle code packages/virtual DCUs packages/virtual ECU packages to determine if placing one or more of the already implemented virtual DCU/ECU packages in a different virtual DCU/ECU orchestration environment would improve system performance, increase certifications levels of the virtual DCUs/ECUs, or otherwise provide better performance. If the one or more threshold have not been exceeded at 1614, the virtual DCU/ECU service and/or a virtual DCU/ECU orchestration environment continues to monitor for additional changes.

If the one or more thresholds are exceeded at 1614, at 1616 through 1620, the virtual DCU/ECU service and/or a virtual DCU/ECU orchestration environment determines effects of relocating one or more already implemented virtual DCU package or virtual ECU packages to different virtual DCU/ECU orchestration environments. For example, re-locating executing code of a vehicle code page to a different virtual DCU/ECU orchestration environment may free up capacity at a lower latency vehicle orchestration environment to better serve virtual DCU/ECU packages that benefit from low latencies.

At 1622, the virtual DCU/ECU service and/or a virtual DCU/ECU orchestration environment selects based on the determined effects respective placements for vehicle code packages/virtual DCU packages/virtual ECU packages that are to be relocated as part of the re-shuffling.

Example Computer System

Figure 17:
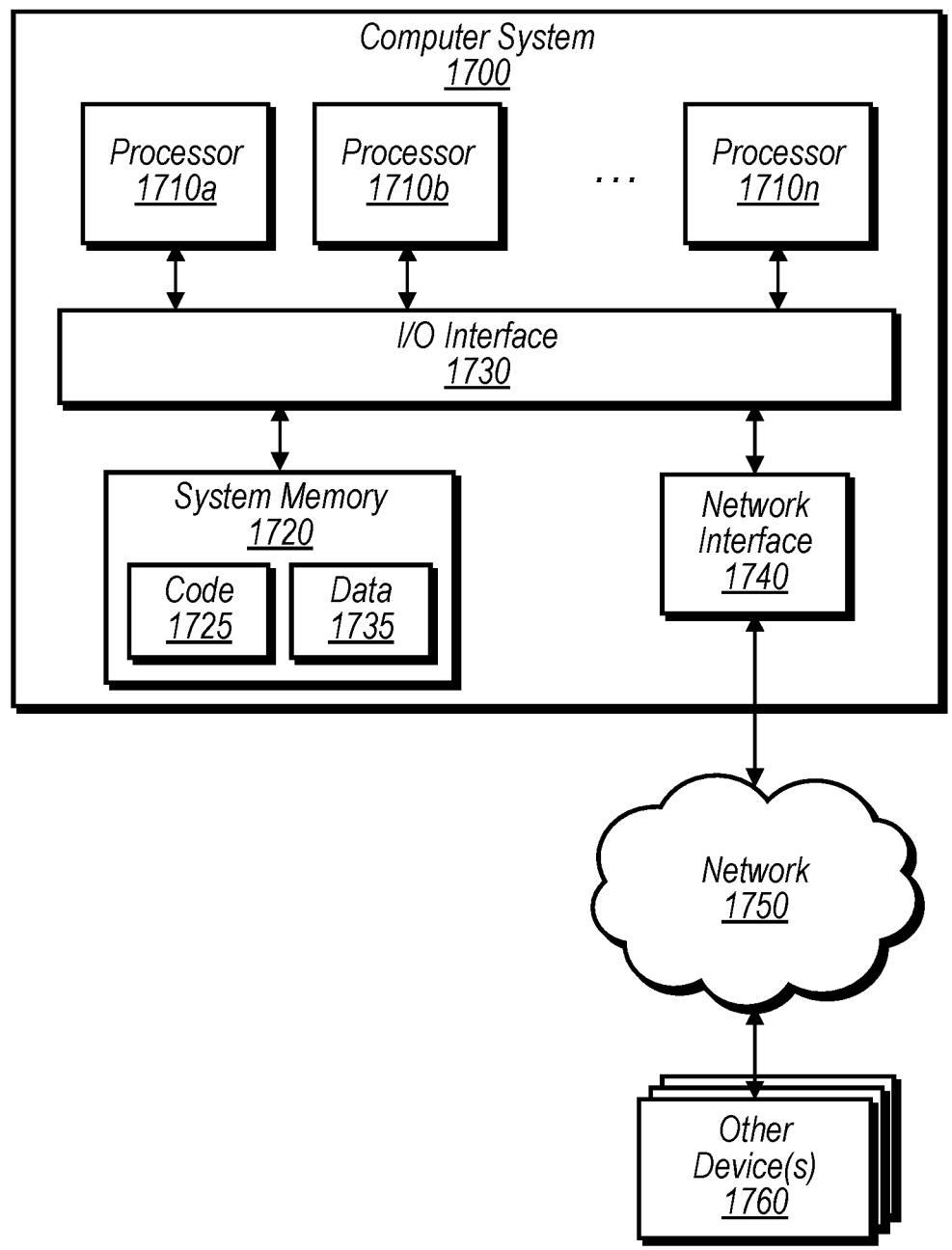
FIG. 17 is a block diagram illustrating an example computer system that implements some or all of the techniques described herein, according to some embodiments.

FIG. 17 is a block diagram illustrating an example computer system that implements some or all of the techniques described herein, according to some embodiments.

Any of various computer systems may be configured to implement processes associated with a synthetic sensor service, a synthetic sensor orchestration environment, a provider network that implement a synthetic sensor service, an operating system in a vehicle or device, or any other component of the above figures. For example, FIG. 17 is a block diagram illustrating an example computer system that implements some or all of the techniques described herein, according to some embodiments. In various embodiments, the virtual DCU/ECU service, virtual DCU/ECU orchestration environments, the provider network that implement the virtual DCU/ECU service and other cloud services, the operating system in a vehicle or device, or any other component of the above figures FIGS. 1-16 may each include one or more computer systems 1700 such as that illustrated in FIG. 17.

In the illustrated embodiment, computer system 1700 includes one or more processors 1710 coupled to a system memory 1720 via an input/output (I/O) interface 1730. Computer system 1700 further includes a network interface 1740 coupled to I/O interface 1730. In some embodiments, computer system 1700 may be illustrative of servers implementing enterprise logic or downloadable application, while in other embodiments servers may include more, fewer, or different elements than computer system 1700.

In various embodiments, computing device 1700 may be a uniprocessor system including one processor or a multiprocessor system including several processors 1710A-1710N (e.g., two, four, eight, or another suitable number). Processors 1710A-1710N may include any suitable processors capable of executing instructions. For example, in various embodiments, processors 1710A-1710N may be processors implementing any of a variety of instruction set architectures (ISAs), such as the x86, PowerPC, SPARC, or MIPS ISAs, or any other suitable ISA. In some embodiments, processors 1710A-1710N may include specialized processors such as graphics processing units (GPUs), application specific integrated circuits (ASICs), etc. In multiprocessor systems, each of processors 1710A-1710N may commonly, but not necessarily, implement the same ISA.

System memory 1720 may be configured to store program instructions and data accessible by processor(s) 1710A-1710N. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1720 as code (i.e., program instructions) 1725 and data 1726.

In one embodiment, I/O interface 1730 may be configured to coordinate I/O traffic between processors 1710A-1710N, system memory 1720, and any peripheral devices in the device, including network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, I/O interface 1730 may include support for devices attached via an automotive CAN bus, etc. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processors 1710A-1710N.

Network interface 1740 may be configured to allow data to be exchanged between computing device 1700 and other devices 1760 attached to a network or networks 1750. In various embodiments, network interface 1740 may support communication via any suitable wired or wireless general data networks, such as types of Ethernet networks, cellular networks, Bluetooth networks, Wi-Fi networks, Ultra-wideband Networks, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1700 via I/O interface 1730. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1700 as system memory 1720 or another type of memory. Further, a computer-readable medium may include transmission media or signals such as electrical, electromagnetic, or digital signals, conveyed via a communication medium such as a network and/or a wireless link, such as may be implemented via network interface 1740. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices storing program instructions for implementing a local orchestration environment and a remote execution environment for vehicle code packages, wherein the program instructions, when executed on the one or more computing devices, cause the one or more computing devices to:
   implement the local orchestration environment at a vehicle;
   receive, from the vehicle that implements the local orchestration environment, a request to deploy a vehicle code package comprising logic and communication mappings at the remote execution environment, wherein the request to deploy the vehicle code package is based on a placement decision, made by the local orchestration environment for the vehicle to place the vehicle code package at the remote execution environment, and wherein the remote execution environment has been selected from a plurality of placement locations comprising the local execution environment and the remote execution environment during the placement decision based on a current latency for communication from the local orchestration environment to the remote execution environment;
   perform one or more configuration operations to implement the vehicle code package at the remote execution environment, wherein the one or more configuration operations comprise dynamically configuring one or more communication interfaces to implement the communication mappings for one or more input sources for the logic and at least one output destination for the logic;
   instantiate, at the remote execution environment, a code execution thread for the vehicle code package that has been selected to be placed at the remote execution environment based on the placement decision;
   execute, at the remote execution environment, code included in the vehicle code package via the one or more computing devices that implement the remote execution environment, wherein the execution of the code uses input data received by the logic from the one or more input sources via the one or more dynamically configured communication interfaces; and
   provide data resulting from the execution of the code of the vehicle code package at the remote execution environment to one or more computing devices installed in the vehicle that implement the local orchestration environment for the vehicle, wherein at least one of the one or more dynamically configured communication interfaces provide the resulting data to the one or more computing devices installed in the vehicle that implement the local orchestration environment for the vehicle.

2. The system of claim 1, further comprising:
one or more wireless communication devices configured to establish a wireless network connection with the vehicle,
wherein the one or more computing devices that implement the remote execution environment are located at an edge of the wireless network connection at a location proximate to a location of the one or more wireless communication devices that are configured to establish the wireless network connection.

3. The system of claim 1, further comprising:
one or more wireless communication devices configured to establish a wireless network connection with the vehicle; and
one or more intermediate networking devices configured to connect the wireless communication devices to a service provider network comprising one or more data centers,
wherein the one or more computing devices that implement the remote execution environment are located in the one or more of the data centers of the service provider network.

4. The system of claim 3, wherein the program instructions, when executed on the one or more computing devices that implement the remote execution environment, cause the one or more computing devices to:
store data resulting from the execution of the code or other data received about the vehicle in a persistent data storage at one or more of the data centers of the service provider network.

5. The system of claim 4, wherein:
the vehicle code package is associated with a customer account of a customer of the service provider network;
the stored data resulting from the execution of the code or the stored other data received about the vehicle are associated with the customer account of the customer of the service provider network and stored in the service provider network in association with the customer account; and
the remote execution environment is configured to apply the stored data or the other stored data associated with the customer account when executing other vehicle code packages for other vehicles that are associated with the customer account of the customer of the service provider network.

6. The system of claim 5, wherein the vehicle is a vehicle manufactured by a first manufacturer, and wherein the program instructions, when executed on the one or more computing devices that implement the remote execution environment, cause the one or more computing devices to:
receive a placement decision for another vehicle code package for another vehicle manufactured by a second manufacturer that is different from the first manufacturer, wherein the vehicle code package and the other vehicle code package are associated with the customer account of the customer of the service provider network;
instantiate a code execution thread for the other vehicle code package for the other vehicle manufactured by the second manufacturer, in response to the placement decision to place the other vehicle code package for the other vehicle at the remote execution environment;
provide the code execution thread access to the persistently stored data or the other persistently stored data associated with the customer account of the customer of the service provider network;
execute code included in the other vehicle code package via the one or more computing devices that implement the remote execution environment; and
provide data resulting from the execution of the code of the other vehicle code package to one or more computing devices installed in the other vehicle manufactured by the second manufacturer that implement a local orchestration environment for the other vehicle.

7. The system of claim 4, wherein the service provider network further comprises:
one or more additional computing devices configured to implement one or more additional services of the service provider network, wherein the one or more additional services of the provider network are configured to:
identify customer preferences of the customer based on the persistently stored data or the other persistently stored data associated with the customer account; and
provide the customer preferences as inputs to code execution threads for vehicle code packages associated with a customer account received from two or more vehicles manufactured by different manufacturers.

8. The system of claim 1, wherein:
the vehicle code package is associated with a customer account of an original equipment provider of the vehicle with a service provider network that implements the remote execution environment; and
wherein the original equipment provider manages the customer account with the service provider network such that a consumer of the vehicle is not required to manage a customer account with the service provider network.

9. The system of claim 8, wherein:
the vehicle code package is for a virtual electronic control unit (virtual ECU) package or a virtual domain control unit (virtual DCU) package and is in an enveloped format comprising one or more annotations outside of an envelope of the code package that indicate one or more properties or requirements of a virtual ECU or virtual DCU that is to execute the code package; and
the one or more properties or requirements of the virtual ECU or virtual DCU are defined by the original equipment provider of the vehicle.

10. The system of claim 8, wherein the service provider network comprises one or more additional computing devices further configured to provide an electronic control unit (ECU) or domain control unit (DCU) testing service to the original equipment provider,
wherein the program instructions, when executed on the one or more computing devices that implement the remote execution environment, cause the one or more computing devices to:
store data resulting from the execution of the code or other data received about the vehicle in a persistent data storage of the service provider network; and
provide the persistently stored data or the other persistently stored data to the ECU or DCU testing service for use in evaluating the code executed in the remote execution environment, wherein the logic of the code comprises logic for an ECU or DCU being tested as part of the ECU or DCU testing service.

11. The system of claim 1, wherein the remote execution environment for the vehicle code package implements a standardized coding paradigm for developers of vehicle code packages to be executed via one or more virtual electronic control units (virtual ECUs) or one or more virtual domain control units (virtual DCUs).

12. A method for implementing a remote execution environment for vehicle code packages, the method comprising:
receiving, from a vehicle that implements a local orchestration environment, a request to deploy a vehicle code package comprising logic and communication mappings at the remote execution environment, wherein the request to deploy the vehicle code package is based on a placement decision made by the local orchestration environment for the vehicle to place the vehicle code package at the remote execution environment, and wherein the remote execution environment has been selected from a plurality of placement locations comprising the local execution environment and the remote execution environment during the placement decision based on a current latency for communication from the local orchestration environment to the remote execution environment;
performing one or more configuration operations to implement the vehicle at the remote execution environment, wherein the one or more configuration operations comprise dynamically configuring one or more communication interfaces to implement the communication mappings for one or more input sources for the logic and at least one output destination for the logic;
instantiating, at the remote execution environment, a code execution thread for the vehicle code package that has been selected to be placed at the remote execution environment based on the placement decision;
executing, at the remote execution environment, code included in the vehicle code package via one or more computing devices that implement the remote execution environment, wherein the execution of the code uses input data received by the logic from the one or more input sources via the one or more dynamically configured communication interfaces; and
providing data resulting from the execution of the code of the vehicle code package at the remote execution environment to one or more computing devices installed in the vehicle that implement the local orchestration environment for the vehicle, wherein at least one of the one or more dynamically configured communication interfaces provide the resulting data to the local orchestration environment for the vehicle.

13. The method of claim 12, wherein one or more computing devices that implement the remote execution environment are located at an edge location proximate to a location of one or more wireless communication devices that are configured to establish a wireless network connection with the vehicle.

14. The method of claim 12, wherein the one or more computing devices that implement the remote execution environment are located in one or more data centers of a service provider network.

15. The method of claim 12,
wherein the vehicle code package is associated with a customer account, of an original equipment provider of the vehicle, with a service provider network that implements the remote execution environment; and
wherein the original equipment provider manages the customer account with the service provider network such that a consumer of the vehicle is not required to manage a customer account with the service provider network.

16. The method of claim 12, wherein:
the vehicle code package is for a virtual electronic control unit (virtual ECU) package or a virtual domain control unit (virtual DCU) package and is in an enveloped format comprising one or more annotations outside of an envelope of the code package that indicate one or more properties or requirements of a virtual ECU or virtual DCU that is to execute the code package; and
the one or more properties or requirements of the virtual ECU or virtual DCU are defined by an original equipment provider of the vehicle.

17. One or more non-transitory, computer-readable, storage media storing program instructions that, when executed on or across one or more processors, cause the one or more processors to:
implement a local orchestration environment at a vehicle;
receive, from the vehicle that implements the local orchestration environment, a request to deploy a vehicle code package comprising logic and communication mappings at a remote execution environment, wherein the request to deploy the vehicle code package is based on a placement decision made by the local orchestration environment for the vehicle to place the vehicle code package at the remote execution environment, and wherein the remote execution environment has been selected from a plurality of placement locations comprising the local execution environment and the remote execution environment during the placement decision based on a current latency for communication from the local orchestration environment to the remote execution environment;
perform one or more configuration operations to implement the vehicle code package at the remote execution environment, wherein the one or more configuration operations comprise dynamically configuring one or more communication interfaces to implement the communication mappings for one or more input sources for the logic and at least one output destination for the logic;
instantiate, at the remote execution environment, a code execution thread for the vehicle code package that has been selected to be placed at the remote execution environment based on the placement decision;
execute, at the remote execution environment, code included in the vehicle code package, wherein the execution of the code uses input data received by the logic from the one or more input sources via the one or more dynamically configured communication interfaces; and
cause data resulting from the execution of the code of the vehicle code package at the remote execution environment to be provided to one or more computing devices installed in the vehicle that implement the local orchestration environment for the vehicle, wherein at least one of the one or more dynamically configured communication interfaces provide the resulting data to the one or more computing devices installed in the vehicle that implement the local orchestration environment for the vehicle.

18. The one or more non-transitory, computer-readable, storage media of claim 17, wherein the program instructions are configured to implement the remote execution environment at an edge location proximate to a location of one or more wireless communication devices that are configured to establish a wireless network connection with the vehicle.

19. The one or more non-transitory, computer-readable, storage media of claim 17, wherein the program instructions are configured to implement the remote execution environment at one or more data centers of a service provider network.

20. The one or more non-transitory, computer-readable, storage media of claim 17, wherein the remote execution environment for the vehicle code package implements a standardized coding paradigm for developers of vehicle code packages to be executed via one or more virtual electronic control units (virtual ECUs) or one or more virtual domain control units (virtual DCUs).

* * * * *